(12) United States Patent
Matsuo et al.

(10) Patent No.: US 7,093,042 B2
(45) Date of Patent: Aug. 15, 2006

(54) MICROCOMPUTER AND DATA PROCESSING DEVICE

(75) Inventors: Toshihiro Matsuo, Tokyo (JP); Hiromichi Ishikura, Kodaira (JP); Hirofumi Mukai, Kokubunji (JP); Naoki Yada, Sayama (JP)

(73) Assignees: Renesas Technology Corp., Tokyo (JP); Hitachi Hokkai Semiconductor, Ltd., Hokkaido (JP)

( * ) Notice: Subject to any disclaimer, the term of this patent is extended or adjusted under 35 U.S.C. 154(b) by 892 days.

(21) Appl. No.: 10/079,619

(22) Filed: Feb. 22, 2002

(65) Prior Publication Data
US 2002/0144035 A1  Oct. 3, 2002

(30) Foreign Application Priority Data
Mar. 30, 2001  (JP)  ............................. 2001-097809

(51) Int. Cl.
*G06F 13/00* (2006.01)
*G06F 12/06* (2006.01)

(52) U.S. Cl. ...................................... 710/100; 711/155
(58) Field of Classification Search ..................... None
See application file for complete search history.

(56) References Cited

U.S. PATENT DOCUMENTS

| 4,654,783 | A | * | 3/1987 | Veres et al. ..................... 713/2 |
| 5,712,969 | A | * | 1/1998 | Zimmermann et al. ........ 714/5 |
| 6,085,281 | A | * | 7/2000 | Kopp et al. .................. 711/103 |
| 6,167,344 | A | * | 12/2000 | Fackler et al. ............... 701/115 |
| 6,832,285 | B1 | * | 12/2004 | Yada et al. .................. 711/103 |

FOREIGN PATENT DOCUMENTS

JP  7-261997  10/1995

* cited by examiner

Primary Examiner—John R. Cottingham
Assistant Examiner—Jeremy S. Cerullo
(74) Attorney, Agent, or Firm—Miles & Stockbridge P.C.

(57) ABSTRACT

A process program such as an erasing/programming program is stored in a boot mat in a nonvolatile memory operational in a boot mode specified after reset start, and a transfer control program for the process program is also stored therein in advance. With an action of setting control information to a predetermined register as trigger, the state of an on-chip CPU is changed from placed in execution of an optional user program to enabled for execution of a transfer control program in the boot mat, and the CPU is returned to the re-execution state of the optional program, after the process program is transferred to an on-chip RAM.

39 Claims, 24 Drawing Sheets

FIG. 4(A)

| OPERATION MODE<br>MAT | BOOT MODE | | | WRITER MODE | | |
|---|---|---|---|---|---|---|
| | ACCESS | PROGRAM | ERASE | ACCESS | PROGRAM | ERASE |
| USER MAT (Mmat) | ○ | ○ | ○ | ○ | ○ | ○ |
| USER BOOT MAT (Umat) | ○ | ○ | ○ | ○ | ○ | ○ |
| BOOT MAT (Tmat) | △ | × | × | △ | × | × |
| REPAIR & TRIMMING (Rmat) | × | × | × | × | × | × |

FIG. 4(B)

| OPERATION MODE<br>MAT | USER BOOT MODE | | | USER MODE | | |
|---|---|---|---|---|---|---|
| | ACCESS | PROGRAM | ERASE | ACCESS | PROGRAM | ERASE |
| USER MAT (Mmat) | ○ | ○ | ○ | ○ | ○ | ○ |
| USER BOOT MAT (Umat) | ○ | × | × | ○ | × | × |
| BOOT MAT (Tmat) | △ | × | × | △ | × | × |
| REPAIR & TRIMMING (Rmat) | × | × | × | × | × | × |

MICROCOMPUTER AND DATA PROCESSING DEVICE

BACKGROUND OF THE INVENTION

This invention relates to a microcomputer and a data processing device having an erasable and programmable nonvolatile memory and a CPU (a central processing unit), and more particularly, to a microcomputer configured to enable the nonvolatile memory for erasing and programming under program control, inclusively of the microcomputer-related art applicable to a one-chip microcomputer having a flash memory, for instance.

An electrically erasable and programmable nonvolatile memory such as a flash memory is available for storing information depending on a difference of programmed threshold voltage in a memory cell. In the flash memory, its threshold voltage is made different at difference amounts of holes or electrons accumulated in a floating gate. A higher threshold voltage state relative to a thermal equilibrium threshold voltage state is called a program state, while a lower threshold voltage state relative to the thermal equilibrium threshold voltage state is called an erase state, for instance (the definition to the contrary is also applicable). In this place, a process of repeatedly verifying the threshold voltage state every application of high voltage pulse is required for erase operation of enabling the memory cell for erasing and programming operation of enabling the memory cell for programming. This process is subject to the control by the erasing and programming operations depending on its progress condition. In this case, an erase/program control sequence, when hardware-embodied, is hard to cope with a change of specifications and so on, and therefore, using the CPU software-embodies an erase/program sequence.

A more complicated erase/program sequence is required with the progress of a process generation of the flash memory, and besides, tuning of an erase/program mode to meet the memory characteristics of an individual device is also supposed to be inevitable even throughout mass production. Accordingly, leaving the development of such software to a user will be a considerable burden on the user.

In Japanese Unexamined Patent Publication No. Hei 7(1995)-261997, there is disclosed the related art which places an erasing/programming program and an erase/program control program in a flash ROM, and in the need for reprogramming, transfers these programs to a RAM to reprogram information in the flash ROM under control of the erase/program control program. The above art of providing the erasing/programming program in the state of being stored in the flash memory relieves the user of the burden to a certain degree.

Incidentally, the user defined in the present specification is equivalent to a microcomputer or like semiconductor device user in a broader sense. Accordingly, so far as a semiconductor device is placed at the service of its manufacturer in some meaning, the manufacturer itself is supposed to be a user as well.

SUMMARY OF THE INVENTION

The present inventors made examinations on the art of providing an erasing/programming program in the state of being stored in the flash memory. A writer mode and a boot mode are available for an operation mode, which enables an on-chip flash memory of a microcomputer for erasing and programming. The writer mode is referred to an operation mode, which enables erasing and programming by connecting a microcomputer to a writing unit such as an EPROM writer with the microcomputer assumed to be seemingly equivalent to a flash memory chip. On the other hand, the boot mode is referred to an operation mode, which enables erasing and programming by establishing communication between the microcomputer and a microcomputer-packaged system through asynchronous or like serial interface with the microcomputer packaged in the system. The writer mode may be applied to the case of initially programming programs or data to the on-chip flash memory before the microcomputer is packaged in the system. The boot mode will be good for reprogramming information stored in the on-chip flash memory for program version-up or data tuning after the microcomputer is packaged in the system. In the boot mode described the above, the erasing/programming program provided in the state of being stored in the flash memory is available.

However, a request to reprogram information in the flash memory occurs even while a microcomputer is being placed in execution of an optional program such as a user program (i.e., a program developed by the user). Requests to save the state immediately prior to disconnection of power in equipment control to the flash memory or to optimize control parameters in the flash memory depending on the operational condition of an operator are involved, for instance. The boot mode becomes specified in the operation mode specified after release of reset (that is, reset start is required), and therefore, fails to be used for reprogramming information in the flash memory in continuation at execution of the optional program.

Access to the flash memory boot mat enabled for access in the boot mode, if embodied while the optional program such as the user program is in execution, is supposed to enable execution of the erasing/programming program stored in the flash memory for programming at the optional timing in continuation at execution of the optional program. However, privacy information for tests or the like needing to be closed to the public is often stored in the boot mat, so that it is inconvenient to the user so far as the privacy information is read as well. Incidentally, there has been so devised that execution of the program in the boot mat becomes enabled only when the boot mode requiring reset start is specified, and that all requests for interrupt and right of bus use priority are disabled in the boot mat, permitting no externally optional access to the boot mat.

It is an object of the present invention to provide a microcomputer or a data processing device, which permits a predetermined process program such as an erasing/programming program in a predetermined area of a boot mat or the like to be executed without the need for reset start, in other words, in continuation at execution of an optional program (a user program and so on).

Another object of the present invention is to provide a microcomputer or a data processing device, which permits a predetermined process program such as an erasing/programming program in a predetermined area of a boot mat or the like to be executed in continuation at execution of an optional program (a user program and so on) without opening privacy information in the above predetermined area to the public.

A further object of the present invention is to provide a microcomputer or a data processing device, which is easy to provide improved erase/program reliability when allowed an erasing/programming program to be stored in an on-chip nonvolatile memory.

A still further object of the present invention is to provide a microcomputer or a data processing device, which is hard to lose information stored in an on-chip nonvolatile memory even if runaway of a CPU with an erasing/programming program stored in the nonvolatile memory occurs.

The above described and other objects and new features of the invention will become apparent from the following description with reference to the accompanying drawings.

A description will now be given briefly of the summary on typical features of the invention disclosed in the present application as follows.

That is, a process program such as an erasing/programming program for a nonvolatile memory is stored in a boot mat in the nonvolatile memory operational in an operation mode such as a boot mode specified after reset start, and a transfer control program of the process program is also stored therein in advance. With an action of setting specific control information to a predetermined register as trigger, the state of an on-chip CPU is changed from placed in execution of an optional program (a control program such as a user program) to enabled for execution of the transfer control program in the boot mat, and the CPU is returned to the re-execution state of the optional program, after the process program is transferred to an on-chip RAM (a volatile memory). When the CPU proceeds to execution of the transfer control program, a bus control means is disabled for any external request for the right of bus use priority and disables undesired optional access to information in the boot mat. While the CPU is being placed in execution of the transfer control program, an interrupt control means is enabled for preservation of an interrupt request in such a manner that the CPU may service the preserved interrupt request after completion of return to the re-execution state of the optional program.

The present invention having the above configuration has the following operational effects. (1) The action of setting the specific control information to the predetermined register will be enough for transfer of the process program so that the process program such as the erasing/programming program may be transferred to the on-chip RAM automatically as viewed from the user. Thus, the user may apply simple software to enable the on-chip flash memory for erasing and programming. There is no need for any sequence like the boot mode, which requires reset start after alternation on mode terminal setting. (2) Even if the complicated erase/program control sequence is required, the user maybe relieved considerably from the burden of erase/program control. (3) On completion of transfer of the process program, returning to the state immediately prior to start of execution of the transferred process program may take place. Thus, dynamic program transfer is enabled as a part of execution of the optional program such as the user program like the control program, providing enhanced availability of the microcomputer to the user. (4) Since any external request for the right of bus use priority is disabled while the process program is being transferred, undesired optional access to information in the boot mat is not authorized, providing security for other information in the boot mat. (5) Although the request for interrupt or the like, even if it occurs during transfer of the process program, is disabled, the factor of interrupt is kept preserved such that the request for interrupt will be serviced after completion of transfer of the process program, resulting in no degradation of system response throughout execution of the user program or like optional program.

More specifically, a microcomputer according to the first aspect of the present invention comprises a CPU, a RAM serving as a volatile memory, an interrupt control means, a bus control means, an erasable and programmable nonvolatile memory having a first area and a second area, a first designating means and a second designating means. The first designating means is made up of an input circuit, which may designate a first state that the CPU is placed in execution of a program stored in the first area or a second state that the CPU is placed in execution of a program stored in the second area, and also accepts a mode signal for transition to the first or second state in response to release of reset operation. The second designating means is made up of a first storage means, which may designate a third state that the CPU is placed in execution of a program stored in the first area after transition from the second state, and is allowed to set first control information for transition to said third state while being accessible from the CPU in the second state.

The microcomputer having the above configuration becomes enabled for reference to the first area referred to in the first state like the boot mode started through reset start, by means of transition from the second state like a user mode or a user boot mode to the third state like a SCO mode. Transition from the second state to the third state takes place by setting the first control information to the first storage means, so that the user may apply the simple software to enable the on-chip nonvolatile memory for erasing and programming. There is no need for any sequence like the boot mode, which requires reset start after alternation on mode terminal setting.

It is better to use higher priority interrupt for transition from the second state to the third state. That is, the interrupt control means causes a non-maskable interrupt request, for instance, in response to the action of setting the first control information for transition to the third state to the first storage means, so that the CPU is changed from the second state to the third state in response to the non-maskable interrupt request. Thereby, the interrupt control means is disabled for multiple-interrupt caused by interrupt requests lower in priority level than the non-maskable interrupt request. The interrupt or exception process request higher in priority level than the non-maskable interrupt request is generally considered to be a reset request, and therefore, the CPU may be prevented from runaway, which may occur while the process in the third state is being suspended by the multiple-interrupt.

In response to the first state, the interrupt control means is disabled for any interrupt request, while the bus control means is enabled only for the request for the right of bus use priority from the CPU. Thereby, protection of security for information stored in the first area is ensured in the first state.

In response to the third state, the bus control means is also enabled only for the request for the right of bus use priority from the CPU. Thereby, information to be kept secured may be prevented from being undesirably read from the first area resulting from acquiring the right of bus use priority by the other circuit module in the third state.

In response to the third state, the interrupt control means starts temporarily preserving the request for interrupt in such a manner that the preserved request for interrupt will be serviced after completion of return to the second state. Thereby, even if the request for interrupt or the like occurs during transfer of the process program, the factor interrupt is kept preserved such that the preserved request for interrupt will be serviced after completion of transfer of the process program, resulting in no degradation of system response throughout execution of the user program or like optional program.

A description will now be given of a microcomputer in the second aspect of the present invention specifically with emphasis on a first area program executed in the third state.

For instance, the transfer control program executed by the CPU in the third state and the process program transferred to the RAM as the volatile memory by the transfer control program are stored in the first area.

At this point, the CPU proceeds to execution of the transfer control program in the first area in the third state to transfer the process program to the RAM, and, on completion of transfer, is returned to the second state immediately prior to transition to the third state. On completion of transfer of the process program, returning to the state immediately prior to start of execution of the transfer control program may take place. Thus, dynamic program transfer is enabled as a part of execution of the user program or like optional program, providing enhanced availability of the microcomputer to the user.

The microcomputer of the present invention may also comprise a destination addressing register, which may programmable-address the destination in transfer to the RAM. That is, transfer of the process program to the RAM may cause variations in destination area (optimization of the programming/erasing program). If the program size increases in excess of the user intentioned size, destruction of the information stored in the internal RAM may occur. To prevent this, the destination addressing register is used to permit the user to specify the objective address.

Judging from the same point of view, the microcomputer according to the present invention also comprises a transferred information content register, which is allowed to return the information content of the process program to be transferred to the RAM by the transfer control program. That is, the transferred information content register is provided as a register, which is allowed to return information on transfer size before the process program is transferred to the RAM. When execution of the transfer control program is started, information on transfer length (the information contents) of the process program to be transferred is returned to this register before the process program is transferred. Memory control, if having been performed by the user, permits dynamic transfer of the process program corresponding to the transfer length to an outstanding area in the RAM with reference to memory control information.

The microcomputer according to the present invention may also comprise a transferred program specifying register, which may selectively specify the kind of the process program to be transferred to the RAM. This register may relieve the user of the burden of various kinds of programs.

A description will now be given of the microcomputer according to the second aspect of the present invention with emphasis on the process program such as the erasing/programming program (that is, the erasing program and the programming program) for the nonvolatile memory.

To prevent the nonvolatile memory from undesired reprogramming caused by runaway of the CPU, the microcomputer according to the present invention also comprises a second storage means, which is allowed to set second control information considered to be one of the requirements to enable the nonvolatile memory for erasing and programming, wherein the requirements to enable the first control information to be set to the first storage means are set up by making it condition that the CPU be applied to set third control information as predetermined information other than the second control information to the second storage means in the second state. That is, if runaway of the program causes transfer of the erasing/programming program in a point at which the user needs no erasing and programming, the user program is highly possible to be destructed. To avoid this, it is necessary for the user to store the third control information in the second storage means before the first control information is set to the first storage means. Unless the third control information is stored, the first control information fails to be set to the first storage means. On the other hand, when the third control information is stored in the second storage means in advance, the first control information may be set to the first storage means, permitting transfer of the program.

The second storage means is provided on the assumption that runaway of the program occurred after the erasing/programming program has been transferred. While it is basically otherwise conditioned that erasing and programming caused by runaway of the CPU are disallowed, it is better for further increased reliability to set the second control information to the second storage means before the user starts erasing and programming. Unless the second control information is stored, the erasing and programming operations are remained disallowed even though the other erasing and programming conditions are accidentally enabled.

The requirements to enable the first control information to be set to the first storage means may be also set up by making it condition that the CPU be applied to fetch an instruction from a program having been stored in the RAM as the volatile memory into execution. Thereby, runaway of the CPU resulting from reprogramming the information in the nonvolatile memory may be prevented while the CPU is being applied to fetch the instruction from the nonvolatile memory into execution.

The technique of using the erasing/programming program having been transferred from the first area to the RAM for erasing and programming without the need for an internal sequencer is easy to change the pulse width of applied erasing and programming voltage. However, programming/erasing pulse width varies depending on the operation frequency of the microcomputer chip. To avoid this, the microcomputer according to the present invention further comprises a chip operation frequency information setting register, which permits the user to set information on chip operation frequency in the operation frequency information setting register at the programming/erasing time. Thereby, information on the current operation frequency may be provided for the erasing/programming program with reference to the chip operation frequency register while the erasing/programming program is in execution. The pulse time required for programming/erasing, the number of wait loop times of the transition time and the timer set conditions may be determined on the basis of the information on the chip operation frequency. That is, using the frequency register capable of programmable-setting information on the operation frequency permits the CPU to determine the pulse width of applied high voltage depending on the erasing/programming program with reference to the frequency register in the second state.

Program/erase characteristics or the like vary in wafer as manufacture processes for a semiconductor integrated circuit constituting a microprocessor are varied. The technique of adjusting a program speed or the like by trimming is applied to adjustment of the circuit characteristics in accordance with the above variations. This technique may be by a method of adjusting voltage at the programming/erasing time in a self-matching manner after performing programming/erasing at the time of a device test to measure the programming or erasing rate. The above technique may be similarly applied to determine parameters of the erasing/programming program using erasing/programming characteristic data of the nonvolatile memory after programming/ erasing at the time of a test to store the erasing/programming characteristics of the non-volatile memory in the first area. For instance, when programming takes place at high speed, the program pulse width and programming voltage on that occasion are adjusted according to high-speed programming, whereas when programming takes place at low speed, the above parameters maybe also adjusted according to low-speed programming. The same will be applied to erase operation.

A description will now be given of another aspect of the present invention with emphasis on the programming program. That is, a data processing device comprises a CPU (a central processing unit, a RAM (a volatile memory), an electrically programmable nonvolatile memory having a first storage area for storing a programming program and a transfer control program to transfer the programming program to the RAM and a second storage area for storing a control program serviced by the CPU in a first operation mode, while being enabled to program information by allowing the CPU to execute the programming program, and a storage circuit allowed to set control information by the CPU placed in execution of the control program in the first operation mode. In response to the action of setting the control information to the storage circuit, the CPU starts execution of the transfer control program to transfer the programming program to the RAM. On completion of transfer of the programming program to the RAM, the CPU is returned to the first operation mode for re-execution of the control program.

For instance, in the first operation mode that the CPU is placed in execution of the control program, the CPU starts programming information to the nonvolatile memory by changing its operation from execution of the control program to execution of the programming program having been transferred to the nonvolatile memory. On completion of programming of information to the nonvolatile memory, the CPU returns its operation from execution of the programming program to execution of the control program.

At this point, it may be configured that an internal bus control circuit in the data processing device is disabled for any request for the right of bus use priority from the bas master while the CPU is being placed in execution of the control program.

It maybe also configured that an internal interrupt control circuit of the data processing device has a storage circuit for accepting and storing, intact, interrupt requests being enabled while the CPU is being placed in execution of the control program, and that the interrupt requests stored in the storage circuit are serviced by the CPU on completion of execution of the transfer control program by the CPU. For instance, when the interrupt control circuit is allowed to generate an exception process request higher in priority than non-maskable interrupt to the CPU in response to the action of setting the control information to the storage circuit, and the CPU is allowed to change its operation from the first operation mode for execution of the control program to execution of the transfer control program upon receipt of the exception process request, it may be configured that the interrupt control circuit permits the storage circuit to store the interrupt request being enabled while the CPU is being placed in execution of the transfer control program, and the interrupt request stored in the storage circuit is serviced by the CPU on completion of execution of the transfer control program by the CPU.

A description will now be given of a further aspect of the present invention with emphasis on the erasing program. That is, a data processing device comprises a CPU (a central processing unit), a RAM (a volatile memory), an electrically erasable nonvolatile memory having a first storage area for storing an erasing program and a transfer control program to transfer the erasing program to the RAM and a second storage area for storing a control program serviced by the CPU in a first operation mode, while being enabled to erase information by allowing the CPU to execute the erasing program, and a storage circuit allowed to set control information by the CPU placed in execution of the control program in the first operation mode. In response to the action of setting the control information to the storage circuit, the CPU starts execution of the transfer control program to transfer the erasing program to the RAM. On completion of transfer of the erasing program to the RAM, the CPU is returned to the first operation mode for re-execution of the control program.

For instance, in the first operation mode that the CPU is being placed in execution of the control program, the CPU starts erasing information from the nonvolatile memory by changing its operation from execution of the control program to execution of the erasing program having been transferred to the nonvolatile memory. On completion of erasing of the information from the nonvolatile memory, the CPU returns its operation from execution of the erasing program to execution of the control program.

The same configuration as described the above may be also applied to an internal bus control circuit and an internal interrupt control circuit in this data processing device.

A description will now be given of a still further aspect of the present invention with emphasis on programming and erasing programs. That is, a data processing device according to the still further aspect of the present invention comprises a CPU (a central processing unit), a RAM (a volatile memory), an electrically erasable nonvolatile memory having a first storage area for storing erasing and programming programs and a transfer control program to transfer the erasing and programming programs to the RAM and a second storage area for storing a control program serviced by the CPU in a first operation mode while being enabled to erase and program information by allowing the CPU to execute the erasing and programming programs, and a storage circuit allowed to set control information by the CPU placed in execution of the control program in the first operation mode. In response to the action of setting the control information to the storage circuit, the CPU starts execution of the transfer control program to transfer the erasing and programming programs to the RAM. On completion of transfer of the erasing and programming programs to the RAM, the CPU is returned to the first operation mode for re-execution of the control program.

For instance, in the first operation mode that the CPU is placed in execution of the control program, the CPU starts programming information to or erasing information from the nonvolatile memory by changing its operation from execution of the control program to execution of the erasing or programming program having been transferred to the nonvolatile memory. On completion of programming of the information to or erasing of the information from the nonvolatile memory, the CPU returns its operation from execution of the erasing or programming program to execution of the control program.

BRIEF DESCRIPTION OF THE DRAWINGS

The foregoing and other objects and features of the invention will become apparent from the following description of preferred embodiments of the invention with reference to the accompanying drawings, in which:

FIGS. 4A and 4B are tables illustrating access modes in each operation mode every memory mat in the flash memory;

DETAILED DESCRIPTION OF PREFERRED EMBODIMENTS

A description will now be given of a microcomputer according to the present invention.

Figure 1:
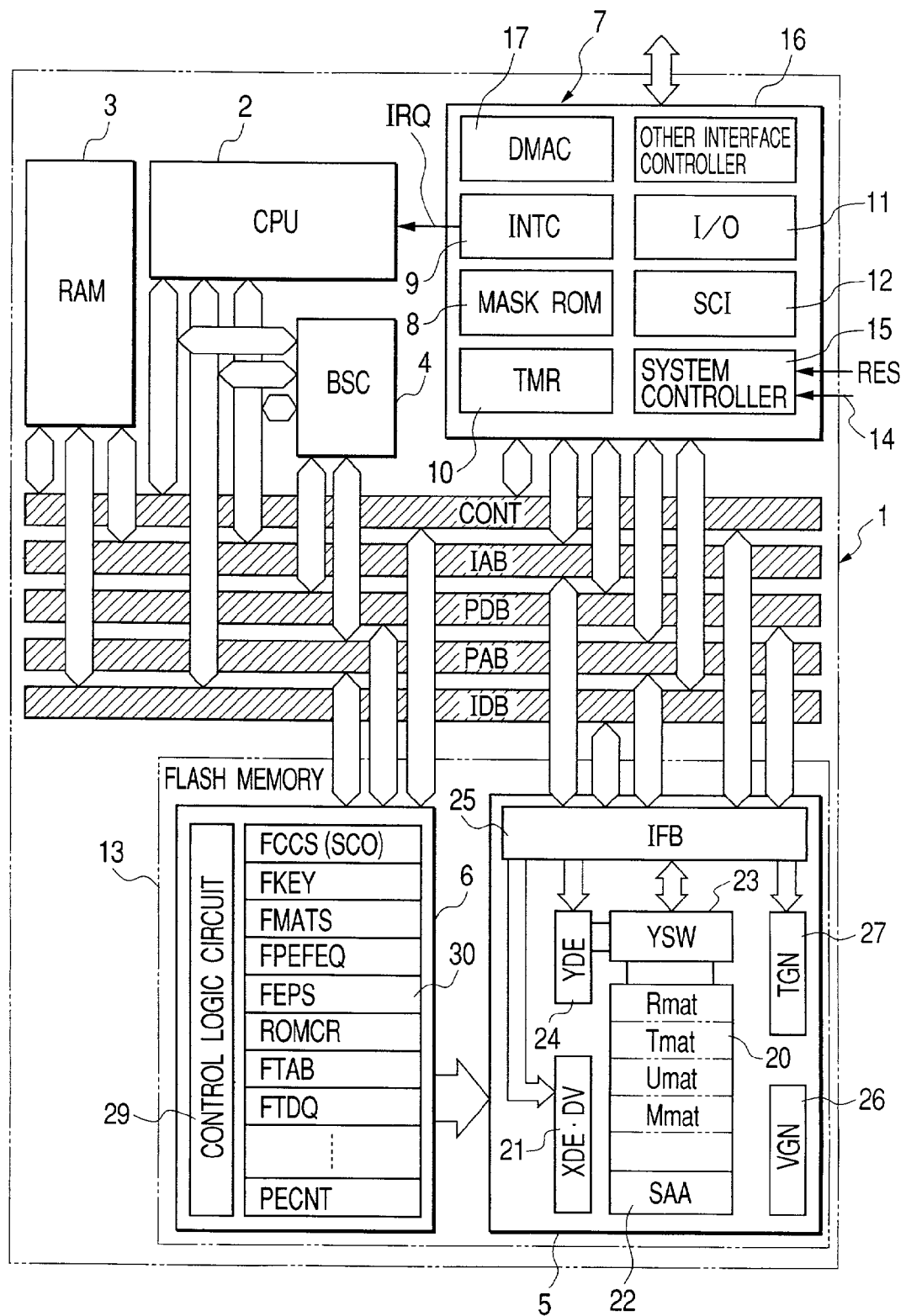
FIG. 1 is a block diagram of a microcomputer according to one embodiment of the present invention.

FIG. 1 shows a microcomputer as a data processing device according to one embodiment of the present invention. Unless otherwise limited, a microcomputer 1 shown in FIG. 1 is formed on one semiconductor substrate (a semiconductor chip) like a single crystal silicon substrate according to a CMOS integrated circuit manufacture technique.

The microcomputer 1 comprises a CPU (a central processing unit) 2 as an operational control unit, a RAM 3 as a volatile memory, a BSC (a bus state controller) 4, a flash memory 13 and the other module 7 as a general term for other internal circuits. The flash memory 13 is referred to an electrically erasable and programmable nonvolatile read only memory and is composed of a flash memory module 5 and a flash control module 6. The other module 7 includes a mask ROM 8, an INTC (an interrupt controller) 9, a TMR (a timer) 10, an I/O (an input/output port) 11, a SCI (a serial interface controller) 12, other interface controller 16, a DMAC (a direct memory access controller) 17 and a system controller 15 or the like. These circuit modules are interfaced through buses IAB, IDB, PAB, PDB and CONT.

The buses IAB, IDB represent an internal address bus and an internal data bus, which transmit information at relatively high speed. The buses PAB, PDB represent a peripheral address bus and a peripheral data bus, which transmit information at relatively low speed. The bus CONT is a general term for control signal lines, which transmit a bus command, a bus access control signal and a timing control signal or the like. The BSC 4 optimum-controls the access operation timing or the like against a difference in operation speed between the internal buses IDB, IAB and the peripheral buses PDB, PAB or different access modes native to access objects, and also controls select of chip or module corresponding to an access address and so on.

Multiple-bit mode signal 14, reset signal RES and others are accepted externally to the system controller 15. When power-on reset or hardware-reset of the microcomputer 1 sets the reset signal RES low, reset occurs in the microcomputer 1 while the reset signal is being low. After release of reset in response to the reset signal RES, an operation mode of the microcomputer 1 is determined according to the state of the multiple-bit mode signal 14. The CPU 2 reads reset vector from a program area correspondingly to the determined operation mode, then fetches an instruction with the vector address and decodes the fetched instruction into execution.

The RAM 3 is also available for a work area of the CPU 2 or a temporary data or program storage area. The mask ROM 8 is applied to a storage area for a data table or the like. The flash memory module 5 is applied to a program or data storage area of the CPU 2.

The INTC 9 is enabled for interrupt requests supplied from the outside of the microcomputer 1 or generated from an internal circuit module depending on the internal state of the microcomputer 1. Then, the INTC 9 arbitrates competing interrupt requests according to the priority level of interrupt and interrupt mask or the like and also masks interrupt on the basis of the priority level of interrupt. The INTC 9 supplies an interrupt signal IRQ to the CPU 2 according to the results of the arbitration of interrupt requests and the masking of interrupt and also supplies an interrupt vector address corresponding the interrupt factor of the enabled interrupt request to the CPU 2. The CPU 2 branches its process to a program specified by the interrupt vector address. The INTC 9, when being enabled for interrupt mask data (IMSK) from the CPU 2, masks interrupt requests lower in priority level than the interrupt mask data (IMSK). Incidentally, the interrupt or the interrupt request defined in the present specification is used on the concept involving an exception process or an exception process request.

The I/O 11 is used for connection to an external address bus and an external data bus, external interface of the SCI 12, input of an external event signal from the TMR 10 and external interface of the interface controller 16 or the like. The interface controller 16 is applicable to interface of ATAPI, SCSI or the like, for instance.

Figure 2:
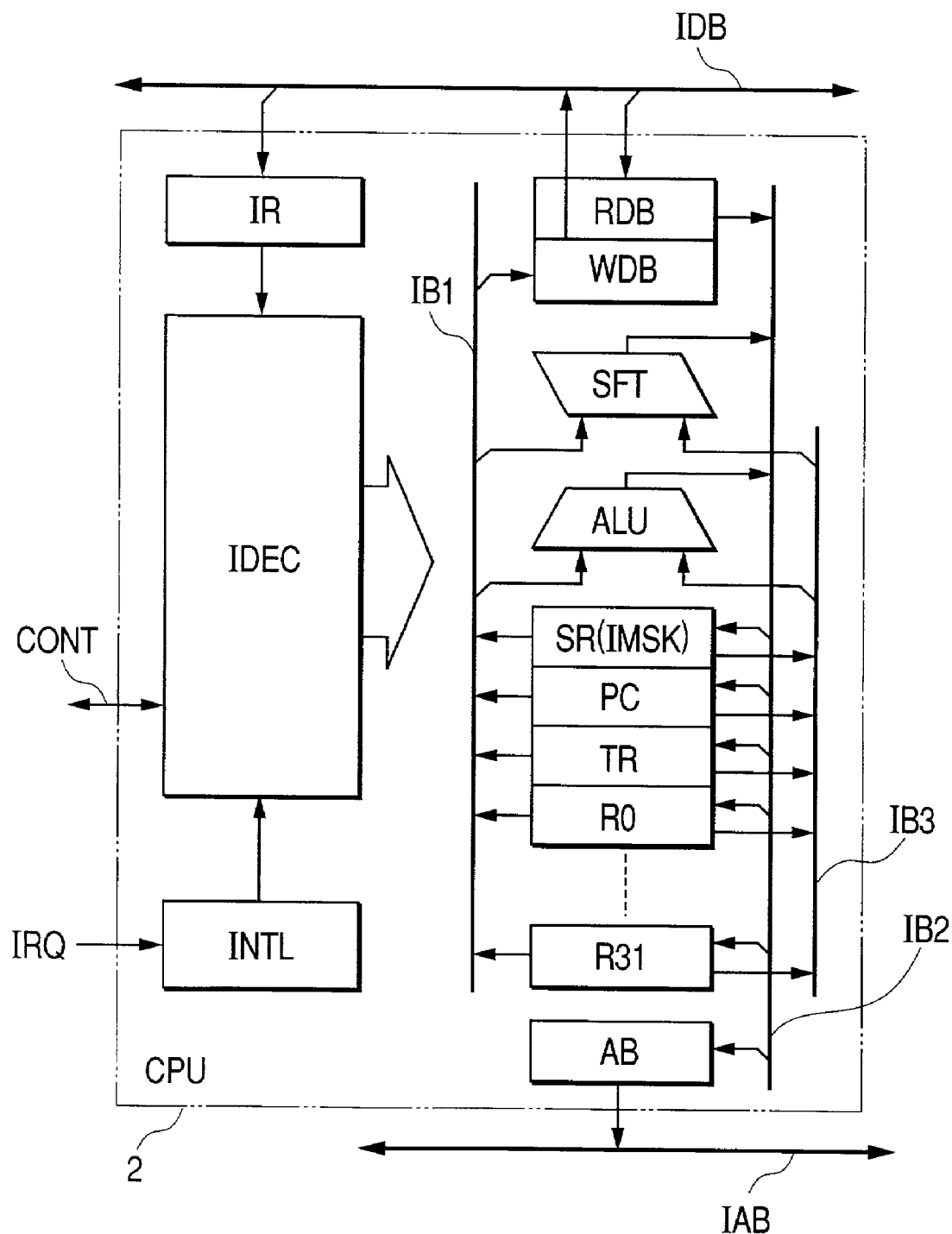
FIG. 2 is a block diagram specifically showing one embodiment of a CPU (a central processing unit) 2.

FIG. 2 specifically shows one embodiment of the CPU 2. Unless otherwise limited, the CPU 2 comprises an execution unit having arithmetic units inclusive of a shifter SFT and an arithmetic logic operation unit ALU, 32-bit general-purpose registers R0 to R31, a program counter PC, registers inclusive of a status register SR and a temporary register TR and buffer circuits inclusive of a read data buffer RDB, a write data buffer WDB and an address buffer AB, and these components are connected to a predetermined internal bus out of first to third internal buses IB1 to IB3. The CPU 2 also comprises an instruction control unit composed of an instruction register IR, an instruction decoder IDEC and an instruction sequence logic INTL.

The read data buffer RDB supplies data through a 32-bit data bus IDB, for instance, to the internal bus IB2. The status register SR has a field of the interrupt mask data IMSK. The interrupt mask data IMSK is supplied to the INTC 9. The INTC 9 masks the interrupt requests lower in priority level than the interrupt mask data IMSK.

The program counter PC is possessed of the next instruction address to be executed. When this instruction address is outputted from the address buffer AB to the internal address bus IAB, an instruction read with the corresponding address of the RAM 3 or the like is fetched by the instruction register IR through the internal data bus IDB. The instruction decoder IDEC decodes the instruction in the instruction register IR and then generates an internal control signal of the CPU 2, and arithmetic operations in the execution unit are controlled. The instruction sequence is changed in response to the interrupt signal IRQ or the like under control of the instruction sequence logic INTL.

In FIG. 1, the flash memory module 5 comprises a memory cell array 20, a XDE/DV (a X-decoder/driver) 21, a SAA (a sense amplifier array) 22, a YSW (a Y-switch array) 23, a YDE (a Y-decoder) 24, an IFB (an input/output circuit) 25, a VGN (a power circuit) 26 and a TGN (a timing generator) 27. The memory cell array 20 is composed of flash memory cells such as electrically erasable and programmable memory elements (not shown) arrayed in a matrix form. Unless otherwise limited, each flash memory cell is of a stack structure that source and drain are provided in a semiconductor substrate or a well area, and a floating gate and a control gate are formed above channels through insulating films. The source, the drain and the control gate are respectively connected to a source line, a bit line and a word line to make up the flash memory cell.

The flash memory cell is enabled to program threshold voltage and stores information according to the programmed threshold voltage. When one flash memory cell is configured to store one-bit information, for instance, a relatively higher threshold voltage state is called a program state, while a relatively lower threshold voltage state is called an erase state. Unless otherwise limited, program operation for enabling the memory cell for programming maybe by a method of causing injection of hot electrons to accumulate electrons in the floating gate by applying 10 V to the control gate, 5 V, for instance, to the drain, and 0 V, for instance, to the source and the substrate to allow current to flow between the drain and the source, providing higher threshold voltage for the memory cell. Unless otherwise limited, erase operation for enabling the memory cell for erasing may be by a method of emitting the accumulated electrons from the floating gate to the substrate by applying 10 V to the control gate and −10 V, for instance, to the source and the substrate and further placing the drain in the open (floating) state, for instance, providing lower threshold voltage for the memory cell.

The IFB 25 makes entry of addresses, control signals and commands, together with input/output of data with the buses IAB, IDB, PAB, PDB and CONT. The address signals accepted to the IFB 25 are further supplied to the XDEC/DV 21 and YDE 24 for decoding. The XDEC/DV 21 selects the word line according to the result of decoding. The YDE 24 selects the bit line through the YSW 23 according to the result of decoding as well. The flash memory cell is selected based on the selected word line and the selected bit line. In read operation, data read from the selected flash memory cell is outputted to the bus PDB or IDB through the IFB 25, after being detected with the SAA 22. In programming operation, program data supplied to the IFB 25 through the bus PDB or IDB is latched by a program latch circuit in the IFB circuit 25, and whether the word line-selected memory cell is to program or block from programming is controlled according to the latch data. The flash memory is subjected to erase in block units prior to programming.

The VGN 26 has a clamp circuit and a charge pump circuit or the like to feed various kinds of voltage required for programming, erasing and read or like operations for the flash memory. The TGN 27 controls interface with the outside of the flash memory on the basis of a strobe signal supplied through the control bus CONT and the commands accepted through the data buses PDB, IDB.

In FIG. 1, the flash control module 6 has a control logic circuit 29 and various kinds of control registers 30 related to programming and erasing for the flash memory module 5 and also to transfer of a program for programming and erasing. Registers FCCS, FKEY, FMATS, FPEFEQ, FEPS, ROMCR, FTAB, FTDQ and PECNT are shown as the typical control registers in FIG. 1. The storage area of the RAM 3 and the general-purpose register of the CPU 2 are also available to control on programming and erase operations for the flash memory module 5.

A description will now be given of a memory mat in the flash memory according to the present invention.

Figure 3:
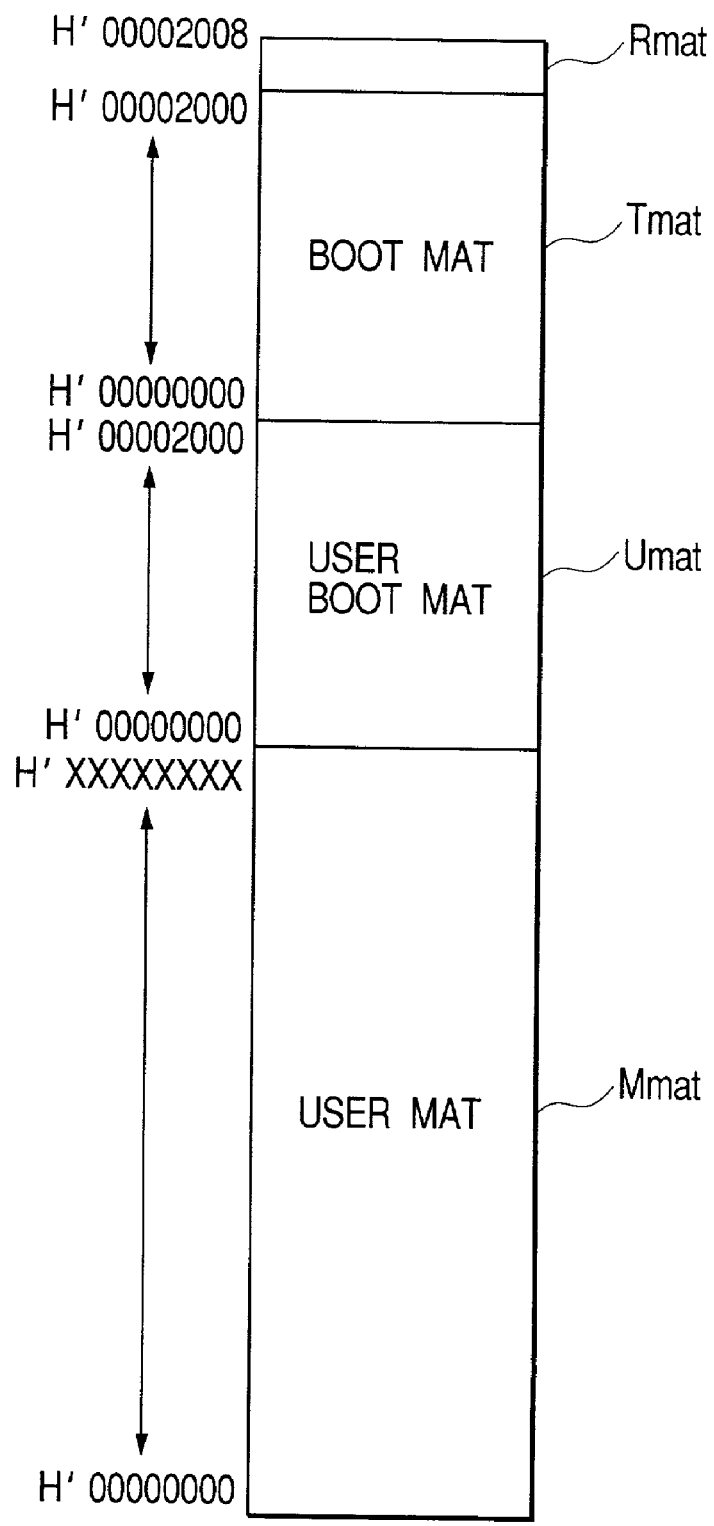
FIG. 3 is an illustration of a memory mat in a flash memory.

FIG. 3 illustrates a memory mat in the flash memory. The memory cell array 20 of the flash memory module 5 has a first area including a boot mat Tmat and a second area including a user boot mat Umat, a user mat Mmat and a repair and trimming mat Rmat. A memory space starting at address 0 (H'0000000), which is a start address in the address space of the CPU 2, is assigned to each of the boot mat Tmat, the user boot mat Umat and the user mat Mmat. That is, the boot mat Tmat, the user boot mat Umat and the user mat Mmat have overlapped address spaces, and as a result, address decode logic is selected in response to the instruction which mat is required for the address decoders YDEC, XDEC/DV. The required mat is determined depending on the microcomputer operation mode specified by the mode signal 14. A fault repair address in the memory cell array or predetermined data of a trimming circuit for trimming according to circuit characteristics are stored in the repair and trimming mat Rmat. The erasing/programming program for the flash memory 13, the transfer control program to transfer the erasing/programming program or the like to the RAM 3 and flash memory characteristic information (erase/program characteristic information) or the like are stored in the boot mat Tmat in advance. The programs stored in the boot mat Tmat are basically prepared by a microcomputer manufacturer itself or under control of the manufacturer.

A description will now be given of an operation mode according to the present invention.

In the flash memory, the programs related to programming and erase operations are being complicated with the progress of a process generation of the flash memory. Under these circumstances, creation of the erasing/programming program, if needed for the user oneself, will be a considerable burden on the user. In the microcomputer 1, consideration is made to apply simple procedure to erasing and programming in any mode, while relieving the user of the burden of creation of the erasing and programming programs. In particular, the microcomputer 1 provides the operation mode, which may apply software to tune parameters such as the time to apply high voltage pulse for erasing and programming for the flash memory 13 or change the process flow hardware-independently, and also permits the simple procedure for erasing and programming without being the burden on the user. As will be simply described in the following, the contents of the operation mode are to permit the erasing/programming program stored in the boot mat Tmat to be referred to in any operation mode, and also to permit the user to use the program stored in the boot mat Tmat to suit the user's own convenience even when a description of a part relating to security is contained.

A description will now be given of the operation mode of the microcomputer 1 in detail. From a point of view on erasing and programming for the flash memory 13, the microcomputer 1 has a writer mode, a boot mode, a user boot mode and a user mode as the operation mode, which may be specified through power-on reset. Unless otherwise limited, the mode signal 14 is a 2-bit signal, and a combination of logic values of the mode signal is decoded by the system controller 15 to decide which operation mode is specified, the writer mode, the boot mode, the user boot mode or the user mode. The microcomputer 1 also has a SCO mode, which may be dynamically specified during the user mode or the user boot mode.

The writer mode is referred to an operation mode, which enables the flash memory 13 for erasing and programming using a writing unit such as an EPROM writer. When the writer mode is specified, the CPU 2 starts execution of the program after fetching vector at a start address of the boot mat T mat subsequently to reset operation (start with the boot mat). Then, a command decision program and programs related to erasing and programming altogether are transferred to the RAM 3 as the process required for the writer mode. Subsequently, the CPU 2 proceeds to execution of the program having been transferred to the RAM 3, and the flash memory 13 is enabled for erasing and programming by the EPROM writer. The writer mode is suited to store the optional user control program or the like in the user mat Mmat and the user boot mat Umat in off board (i.e., the state of the microcomputer placed without being packaged in a system board).

The boot mode is referred to an operation mode, which enables programming using the SCI 12 after all the mats Tmat, Umat and Mmat are subjected to erase. The boot mode allows the CPU 2 to execute the program in the boot mat Tmat, and also disables the boot mat Tmat for erasing and programming. Specifically, when the boot mode is specified, the CPU 2 starts execution of the program after fetching vector at a start address of the boot mat Tmat subsequently to reset operation. Then, the command decision program and the programs related to erasing and programming are transferred from the boot mat Tmat to the RAM 3 as the process required for the boot mat. On completion of transfer and other processes, the CPU 2 proceeds to execution of the program in the RAM 3. Starting the command decision program after the program in the RAM 3 is executed to erase all the mats Umat, Mmat enables programming using the SCI 12. The boot mode is suited to store the optional user control program or the like in the user mat Mmat and the user boot mat Umat in onboard with serial communication interface. During the boot mode, the interrupt requests other than a reset request are masked by the INTC 9, and only the right of bus use priority to the CPU is enabled by the BSC 4, preventing externally undesired program access to the boot mat Tmat in the boot mode.

The user boot mode is referred to an operation mode, which allows the CPU 2 to execute the program in the user boot mat Umat for enabling erasing and programming using user optional interface, while disabling the boot mat Tmat and the user boot mat Umat for erasing and programming. Specifically, in the user boot mode, the CPU is started with the boot mat Tmat to execute the program in the boot mat Tmat, and also to transfer a user boot mat change program to the RAM 3. Subsequently, the CPU 2 proceeds to execution of the program in the RAM 3. Under execution of the program in the RAM 3 by the CPU 2, a mat, visible in the address space of the CPU 2, in the flash memory 13 is changed from the default user mat Mmat to the user boot mat Umat, and the vector address of the user boot mat U mat is read before jumping to an area thereof. When security is applied, jump takes place after the user mat Mmat is subjected to erase. In the need for programming, the erasing/programming program is downloaded from the boot mat Tmat to the RAM 3 using the SCO mode as described later for programming to the user mat Mmat using the downloaded erasing/programming program. That is, using the user-dedicated interface program for the user boot mat Umat may embody transfer of program data in conformity to a user's packaged port. The user boot mode is suited to store the user control program or the like in the user mat Mmat using onboard interface packaged in a user system board. In this operation, the user boot mat Umat is blocked from erasing. Thus, even if the boot mode fails to be used in onboard in the user system board having no serial interface, the user boot mode alternatively ensures programming through onboard interface packaged in the user system board.

The user mode is referred to an operation mode, which enables erasing and programming using the program stored in the user mat Mmat. However, the user mode disables the boot mat Tmat and the user boot mat Umat for erasing and programming. Specifically, in the user mode, the CPU 2 is started with the user mat Mmat to execute the program in the user mat Mmat. In particular, setting the SCO mode by enabling a SCO bit as described later on user's demand changes the boot mat Tmat and the user mat Mmat automatically. Then, the program is started with an address of the boot mat Tmat to transfer the erasing/programming program from the boot mat Tmat to the RAM 3. On completion of transfer of the program, the user mat Mmat and the boot mat Tmat are automatically changed, and return to the user process takes place, whereby the erasing/programming program is applied to the user program for enabling the user mat Mmat for erasing and programming. That is, the erasing/programming program transferred from the boot mat Tmat to the RAM 3 using the SCO mode as described later is made available in the user program mode. The user mode is suited to reprogram parameters and others in the user mat Mmat while the user control program is in onboard-execution.

FIGS. 4A and 4B show the access modes in each operation mode every mat. The access modes in FIG. 4 are shown as a digest of access modes given in the description of the above operation modes. As is apparent in FIG. 4, the repair and trimming mat Rmat and the boot mat Tmat are disabled for erasing and programming in any operation mode, and the user mat Umat is disabled for erasing and programming in the user boot mode and the user mode (the user program mode), which are enabled to execute the user control program. The user boot mode is suited to store the user control program or the like in the user mat Umat using the onboard interface packaged in the user system board. In this operation, the user boot mat Umat is blocked from erasing and programming. Thus, even if the boot mode fails to be used in onboard in the user system board having no serial interface, the user boot mode alternatively ensures programming through onboard interface packaged in the user system board. Incidentally, access in FIG. 4 is equivalent to read access, and a symbol Δ represents that it may be read-accessible according to the program stored in the boot mat, but not optional read-accessible according to the user control program.

Thanks to the user boot mat Umat capable of storing user-dedicated communication protocol, the optional interface packaged in the microcomputer 1 may be applied to erasing and programming for the flash memory 13. Since the user-dedicated interface is made applicable to erasing and programming for the flash memory 13, serial interface is not always provided for a host device. Also, thanks to the user boot mat Umat provided separately from the user mat Mmat, user-optional program interface is applied to erasing and programming without programming the user-dedicated communication protocol in the user mat Mmat, thereby facilitating creation of the control program used in the state of being stored in the user mat Mmat. That is, no special consideration is required for preventing the communication control program used in the user program mode from being erased. The user boot mode starting with the user boot mat Umat hardware-disables the user boot mat Umat for erasing and programming, so that runaway, if occurs, causes no destruction of the information stored in the user boot mat Umat. Besides, runaway of the CPU 2 in debugging does not develop into destruction of the external interface control program, so that the user mat Mmat may be onboard-reprogrammed at will without the need for removal of the packaged microcomputer chip.

A description will now be given of a SCO mode according to the present invention.

Figure 5:
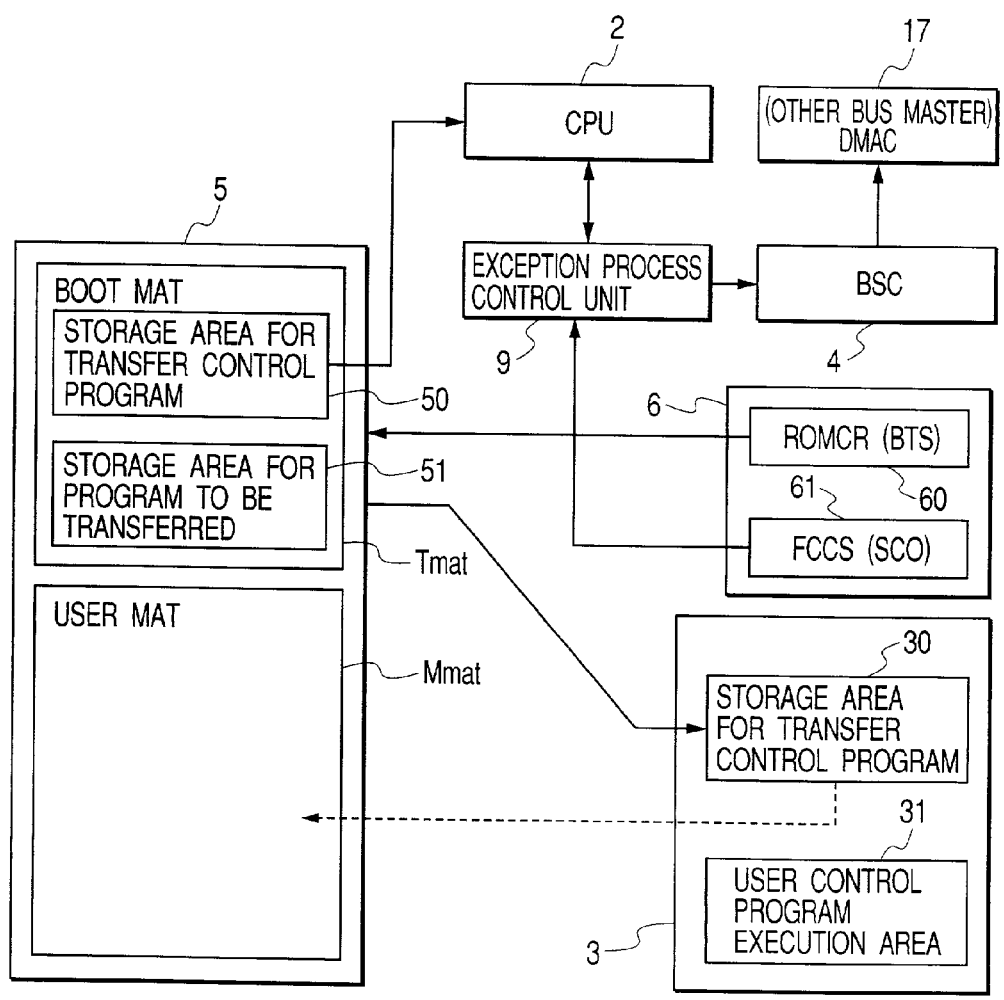
FIG. 5 is a block diagram showing required circuit blocks extracted from the configuration of FIG. 1 for explanation of a SCO mode.

FIG. 5 is a block diagram showing required circuit blocks extracted from the configuration of FIG. 1 for explanation of the SCO mode. Although the SCO mode may be specified with any of the user boot mat Umat and the user mat Mmat, a description will now be given of the case of specifying the SCO mode with the user mat Mmat. The flash control module 6 is composed of a mat change control unit 60 and a SCO start request generation unit 61 as shown in FIG. 5. The mat change control unit 60 has a control register ROMCR, and select of the boot mat is specified when "1" is set to one bit BTS (BTS=1), while non-select of the user mat is specified when "1" is set to BTS (BTS=0). The register ROMCR is not disposed in the address space of the CPU 2, and is therefore supposed to be closed to the user. The SCO start request generation part 61 has a control register FCCS, and 0, when being set to one bit SCO (SCO=0) is given as an initial value just following reset, while the SCO mode is specified when "1" is set to SCO bit (SCO=1). The boot mat Tmat includes a storage area 50 for the transfer control program and a storage area 51 for the program to be transferred. The RAM 3 includes a storage area (the storage area for the transfer program) 30 for the process program and a user control program execution area 31.

Figure 6:
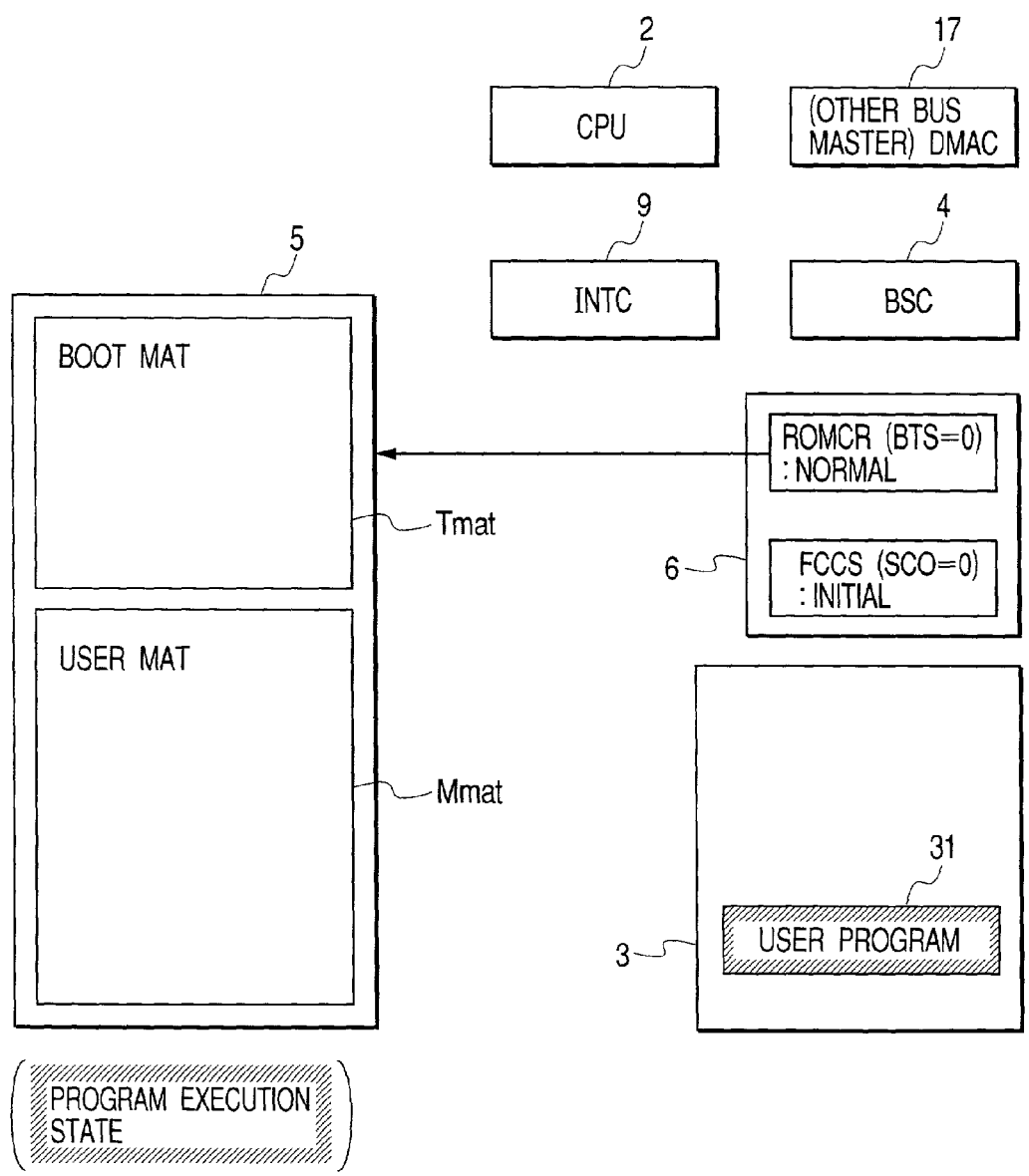
FIG. 6 is a block diagram similar to that of FIG. 5 but showing the state that a user mode is specified.

FIG. 6 shows the state that the user mode is specified, that is, the state considered to be one embodiment of the second state. When the user mode is specified, the CPU 2 starts execution of the user program after fetching of the first vector in the user mat Mmat. The state shown in FIG. 6 is that the CPU 2 is placed in execution of the user program downloaded to the RAM 3. The flash controller module 6 is initialized at this point.

Figure 7:
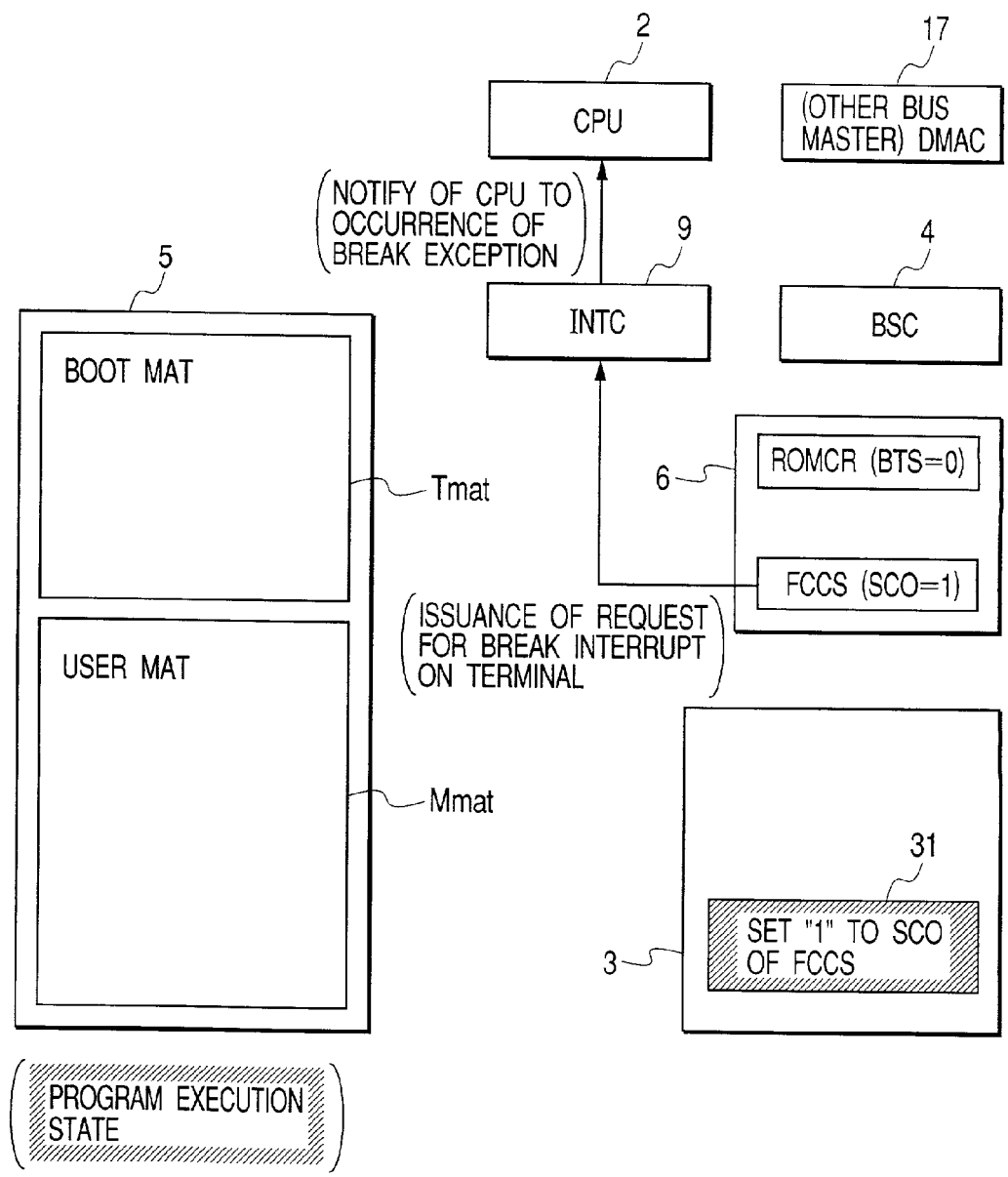
FIG. 7 is a block diagram similar to that of FIG. 5 but showing the state that a SCO bit is set.

FIG. 7 shows the state that the SCO mode is set. The CPU 2 placed in execution of the user program proceeds to a register write cycle to set "1" to the control bit SCO of the register FCCS. Thereby, the flash control module 6 starts issuing a predetermined interrupt request to the INTC 9. Unless otherwise limited, a break interrupt request is applied to this interrupt request. Unless otherwise limited, the break interrupt request is considered to be for interrupt, which embodies a debug support function used for interrupt for return to the system program after execution of the user program in an evaluation microcomputer is stopped, and its priority level is higher than NMI (the non-maskable interrupt request). The priority of the break interrupt request is so higher that this break interrupt request may be always enabled irrespectively of an interrupt mask bit of the CPU 2, and an independent vector address (a vector number 2) is assigned to this break interrupt request. Higher-priority interrupt is preferentially enabled in spite of the occurrence of competition with other interrupt requests. The user break interrupt request as described the above is not substantially required for the microcomputer as the actual chip, while its control function may be easily loaded in the CPU 2 and the INTC 9 of the microcomputer as the actual chip. This function will be used for setting of the SCO mode. Thereby, the INTC 9 supplies the interrupt signal IRQ and the interrupt factor to the CPU 2 to notify the CPU of the occurrence of a break exception process.

Figure 8:
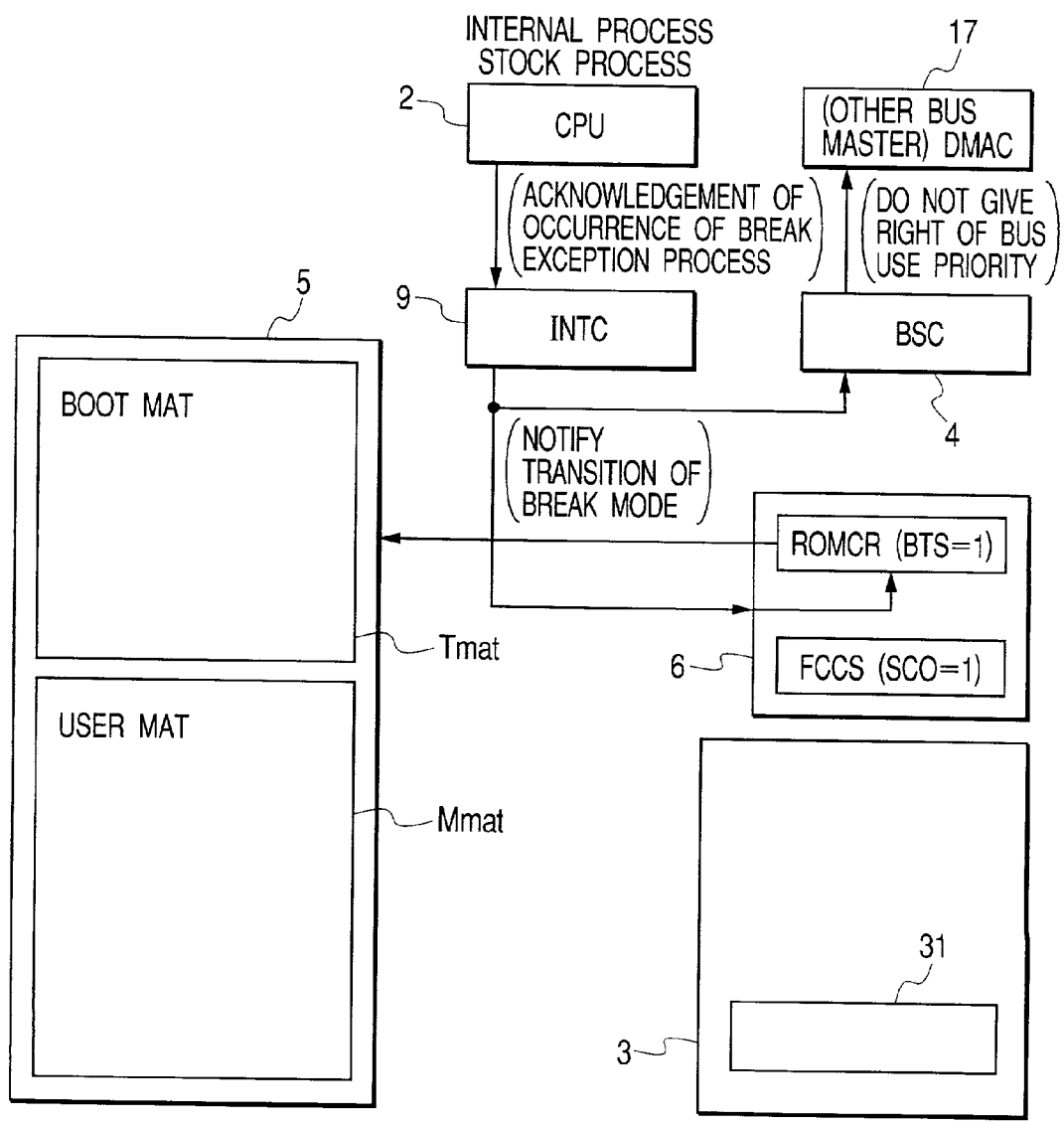
FIG. 8 is a block diagram similar to that of FIG. 5 but showing the state of decision on a break exception process and transition to the SCO mode.

FIG. 8 shows the state of decision on the break exception process and transition to the SCO mode. Immediately after "1" is set to the SCO in the register write cycle of the CPU 2, the INTC 9 notifies the CPU 2 of the occurrence of the break exception process. Upon acknowledgment of the occurrence of the break exception process, the CPU 2 decides the kind of the notified interrupt from the interrupt factor after completion of execution of the instruction. Then, the CPU 2 notifies the INTC 9 that the break exception process will be started, immediately before a cycle (the internal process and the stack process) of transition to the break mode, i.e., the SCO mode in this embodiment takes place. The INTC 9 thus notified firstly masks interrupts lower in priority level than the break exception process, except for the reset interrupt, preventing multiple-interrupt from occurring. Subsequently, the INTC 9 notifies the BSC 4 and the flash control module 6 of the transition to the break exception process. In response to this, the flash control module 6 sets "1" to the control bit BTS of the register ROMCR. Thereby, the flash control module 6 changes the state of the flash memory module 5 to select of the boot mat Tmat. Using the decoders XDE/DV and YDE as described the above embodies select of the boot mat Tmat. On the other hand, the BSC 4 thus notified disables any request for the right of bus use priority from the other bus master to prevent other bus master (such as the DMCA 17) access to the boot mat Tmat during the SCO mode, permitting the right of bus use priority to be given only to the CPU 2.

Thanks to the INTC 9 for masking any interrupt other than the reset interrupt and the BSC 4 for enabling only the right of bus use priority to the CPU 2, undesired external program access to the boot mat Tmat and so on may be prevented during the SCO mode.

However, the INTC 9 in the SCO mode, although being applied to mask any interrupt request other than the reset interrupt, may internally preserve all or part of other interrupt requests in such a manner that the preserved interrupt requests may be serviced after returning from the SCO mode to the user mode takes place.

Figure 9:
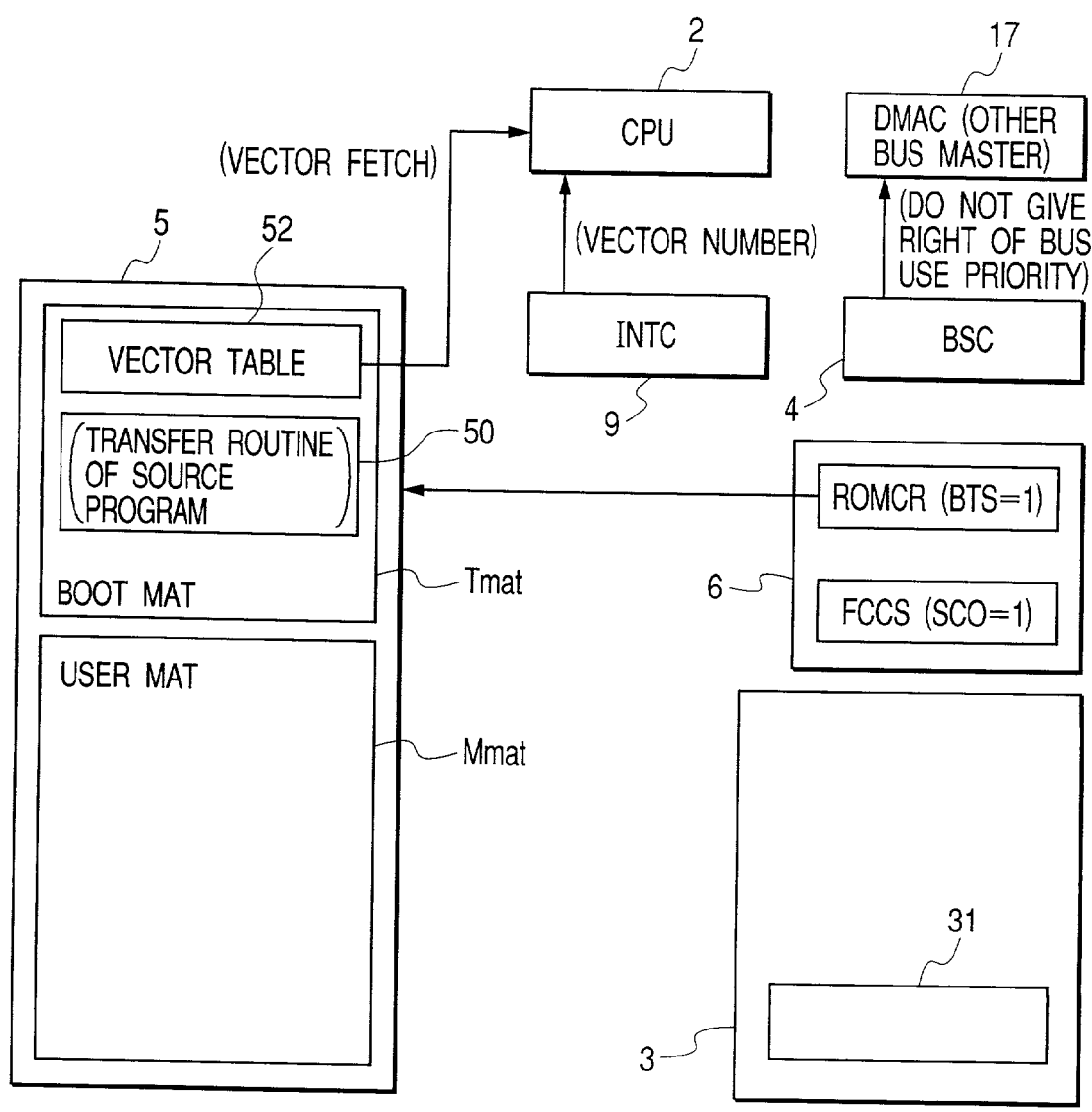
FIG. 9 is a block diagram similar to that of FIG. 5 but showing the state of vector fetch when the SCO mode is specified.

FIG. 9 shows the state of vector fetch when the SCO mode is specified. In the select state of the user mat Tmat, the user mat Tmat is mapped into H'00000000 to H'00002000, and a vector table 52 is formed in the start area of the user mat. The INTC 9 notifies the CPU 2 of the vector number associated with the break exception process, and the vector at the address assigned this vector number is fetched from the vector table 52. It is a matter of course that the fetched vector in this case is made different from the vector fetched when the boot mode is specified. A vector number 2 is assigned to the break interrupt, for instance, and a start address of the process routine (i.e., a transfer routine for the source program) to be executed in the SCO mode is stored in the vector corresponding to the break interrupt. The transfer routine for the source program is considered to be the transfer control program stored in the storage area 50 for the transfer control program. The source program is equivalent to the erasing/programming program or the like stored in the storage area 51 for the program to be transferred.

Figure 10:
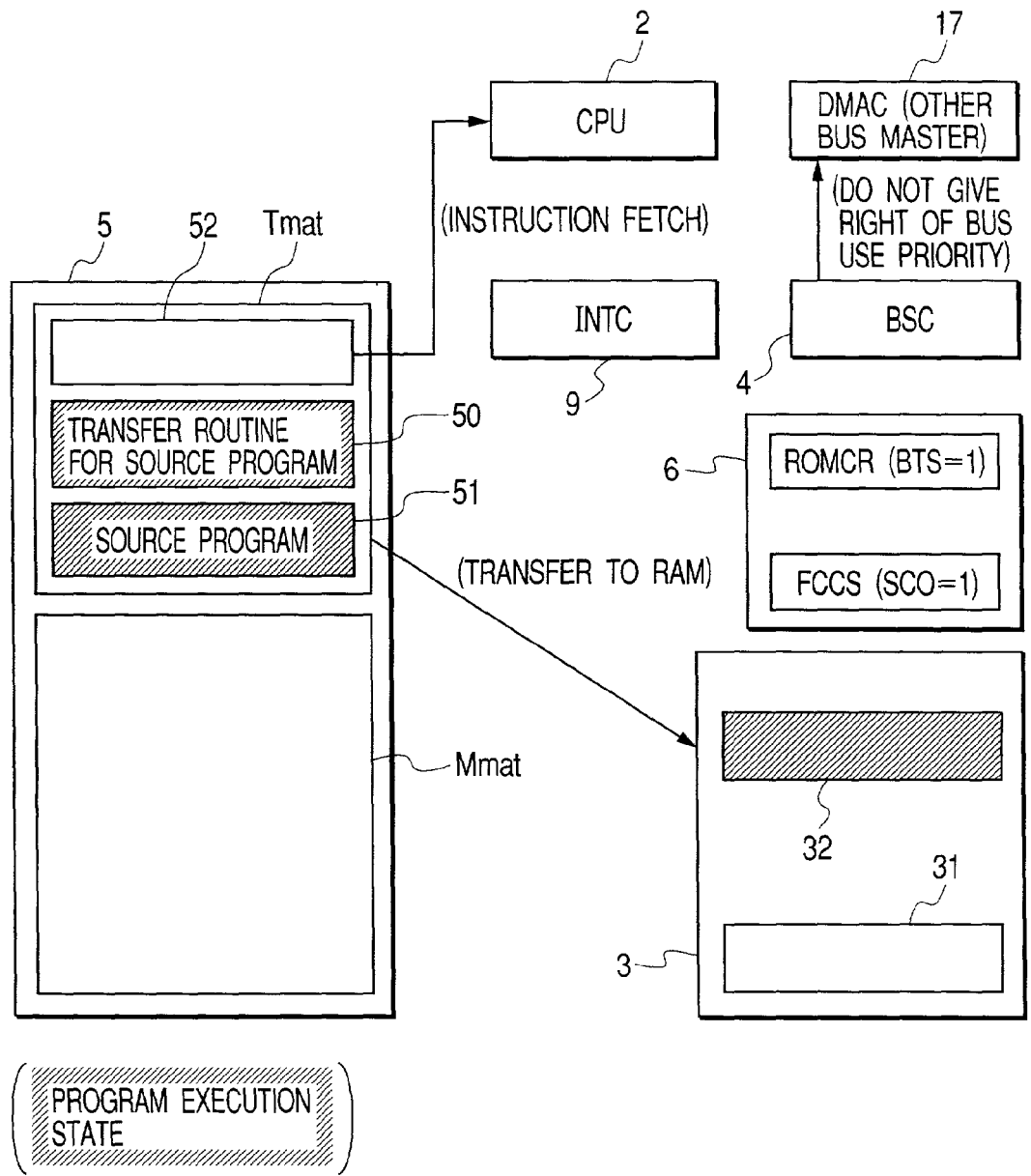
FIG. 10 is a block diagram similar to that of FIG. 5 but showing the state of a process of transferring a source program to a RAM (a volatile memory)

FIG. 10 shows the state of a process of transferring the source program to the RAM 3. The CPU 2 proceeds to branching to the transfer routine for the source program after fetching of an instruction from the origin of the transfer control program in the area 50 assigned the above vector. Then, the CPU 2 starts transferring the source program from the area 51 of the boot mat Tmat to the area 32 of the RAM 3 according to the transfer routine.

A destination addressing register FTAB capable of programmable-addressing the destination in transfer to the RAM 3 will be available for transfer of the process program to the RAM 3 in the SCO mode. When transfer of the process program to the RAM 3 causes variations in destination areas (optimization of the programming/erasing program) so that the size of information to be transferred increases in excess of the user intentioned size, destruction of the information already stored in the internal RAM 3 may occur. To prevent this, using the destination addressing register FTAB permits the user to specify the objective address.

In of view of the similar point, there is provided a transferred information content register FTDQ, which is allowed to return the information content of the process program to be transferred to the RAM 3 by the transfer control program in the SCO mode. That is, when the transfer control program is executed in the SCO mode, information on the transfer length (the information content) of the process program to be transferred is returned to the register FTDQ prior to transfer of the process program. Memory control, if having been performed by the user, permits dynamic transfer of the process program to an outstanding area in the RAM 3 correspondingly to the information on the transfer length with reference to the memory control information.

Figure 11:
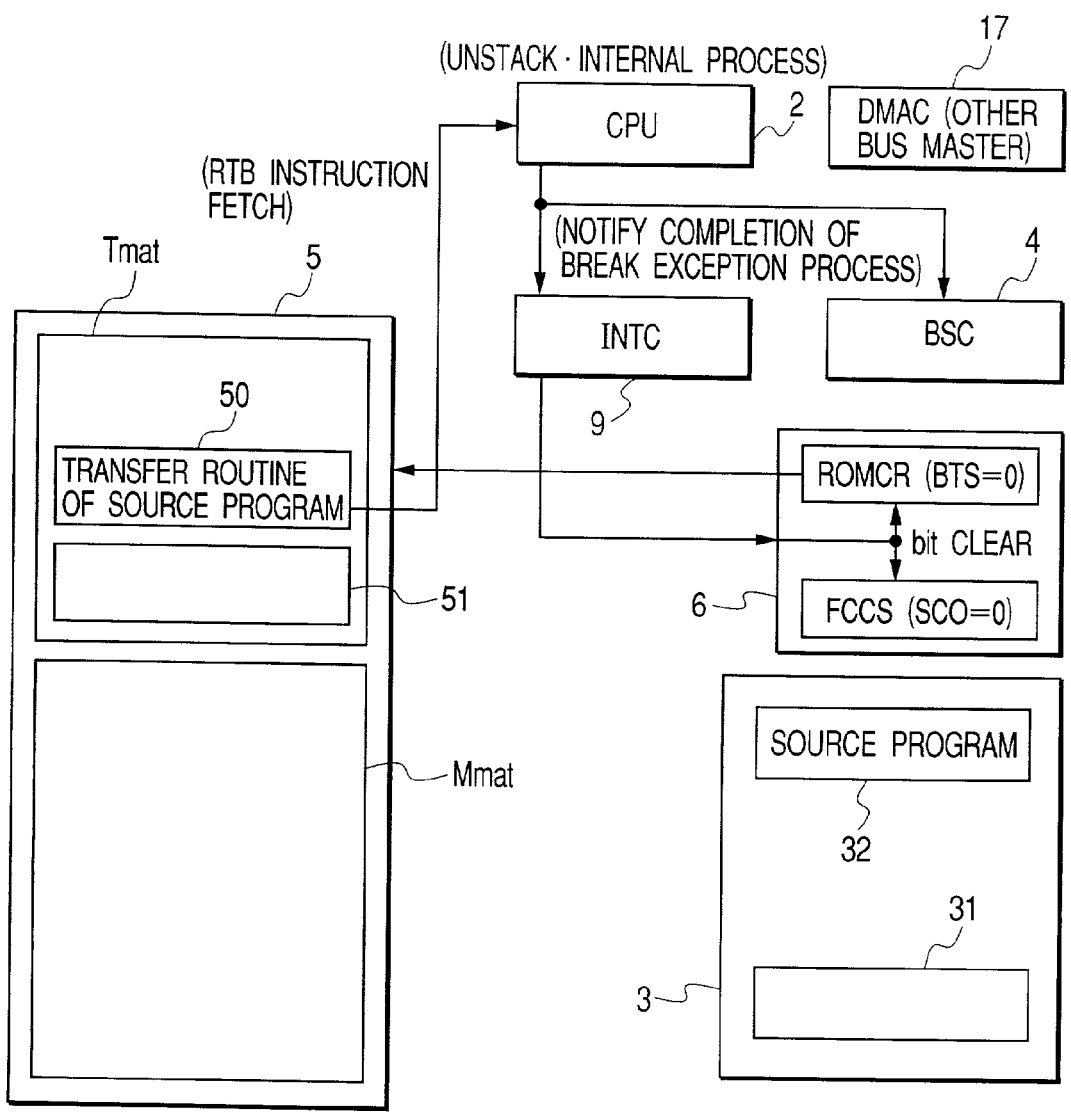
FIG. 11 is a block diagram similar to that of FIG. 5 but showing the state of release from the SCO mode.

FIG. 11 shows the state of release of the SCO mode, that is, a process of returning from the break exception process to a normal mode process. On completion of transfer to the RAM 3, the CPU 2 starts fetching a return/break instruction (RTB: a return instruction from the interrupt service routine) from the last of the transfer routine for the source program. Thereby, the CPU 2 notifies the INTC 9, the BSC 4 and the flash control module 6 of the completion of the break exception process while the cycle (the unstack and internal processes) to return from the break exception process is in execution. Thereby, the BSC 4 starts normal bus arbitration control to eliminate competition from the request for the right of bus use priority. The flash control module 6 is allowed to select the user mat Mmat by cleaning the control bit BST of the register ROMCR and the control bit SCO of the register FCCS to "0".

Figure 12:
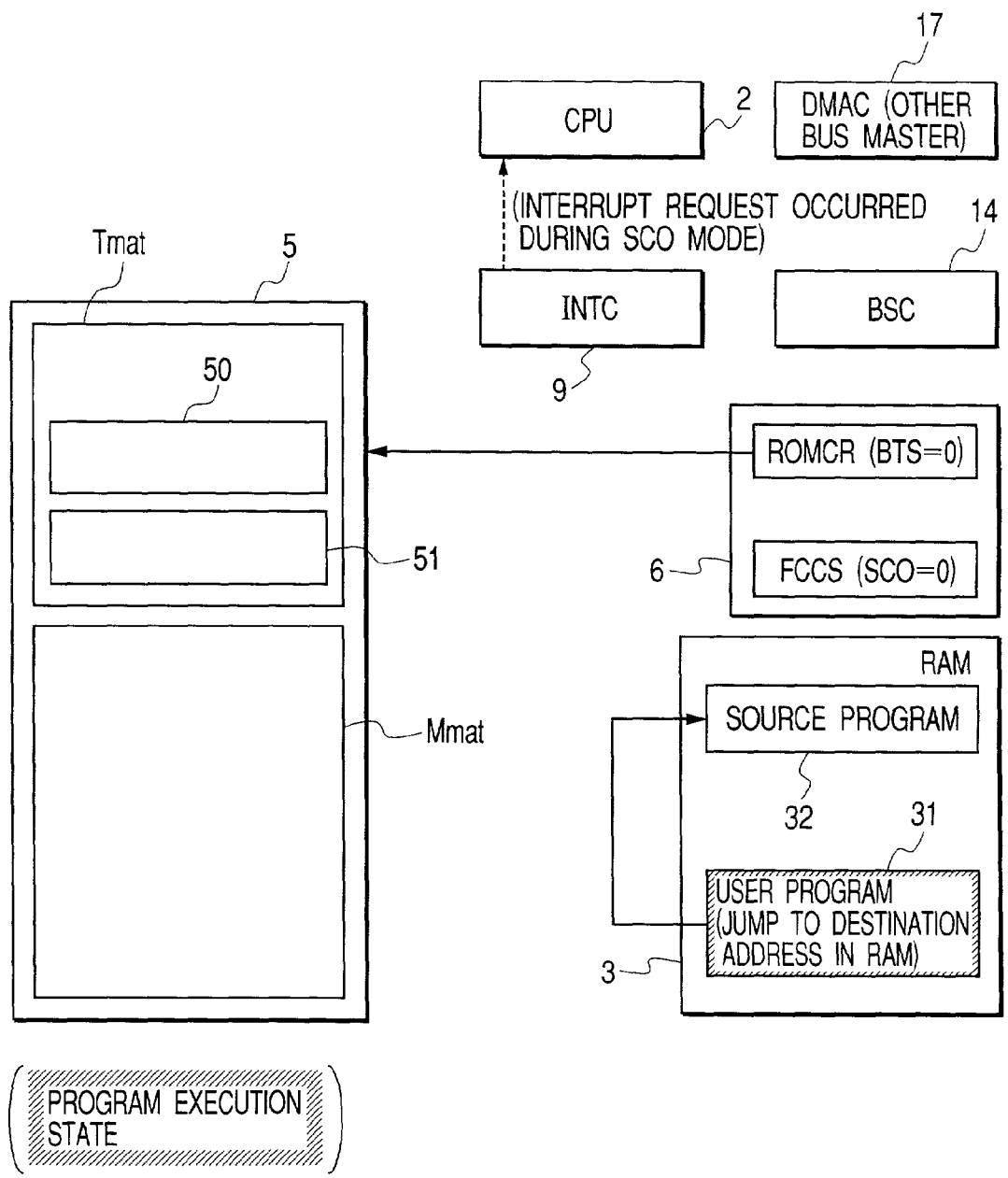
FIG. 12 is a block diagram similar to that of FIG. 5 but showing the state of a process of branching to a source program routine.

FIG. 12 shows the state of a process of branching to the routine for the source program. Returning to a value of the program counter PC of the user program 31 takes place in the unstack process. On completion of returning to the user control, the source program is supposed to be already copied in the area 32 of the RAM 3, and jump to the source program takes place by the user program. While the interrupt request generated during the SCO mode is kept preserved in the INTC 9, an instruction corresponding to the preserved interrupt request is supplied from the INTC 9 to the CPU 2 into execution, before returning to the value of the program counter PC of the user program takes place, unless otherwise limited.

Figure 13:
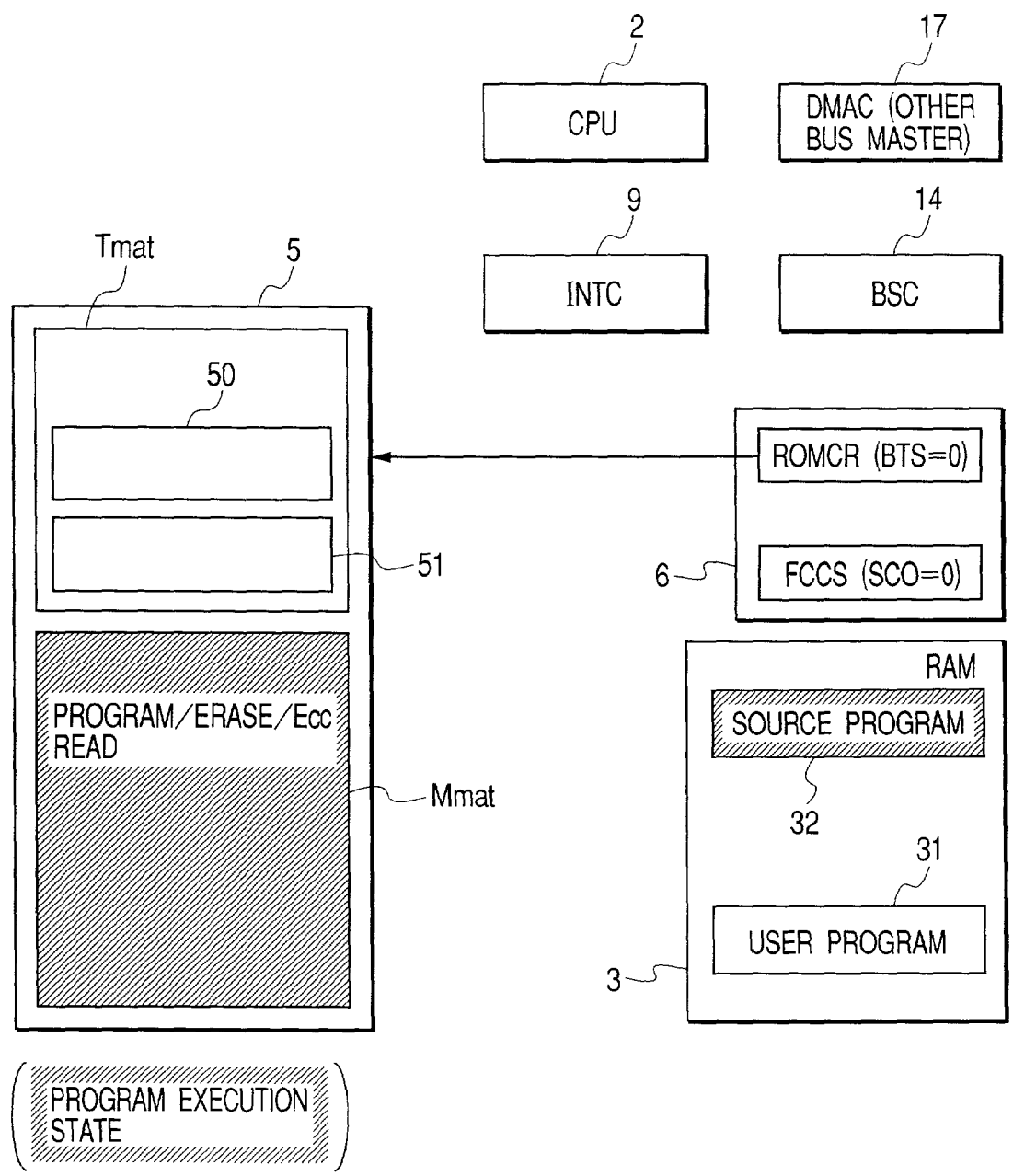
FIG. 13 is a block diagram similar to that of FIG. 5 but showing a source program process after return to a user program.

FIG. 13 shows a source program after completion of returning to the user program. A process of executing the source program transferred from the boot mat Tmat to the area 32 of the RAM 3 to fetch program data from an external host unit, for instance, to the RAM for programming the fetched data to a desired area of the user mat Mmat is involved, for instance. Incidentally, it is also possible to branch to the RAM area at the destination of transfer intact to reprogram information in the flash memory without executing the RTB instruction after transfer of the source program. Executing the RTB instruction after completion of reprogramming may mask also the interrupt in the process of reprogramming.

Figure 14:
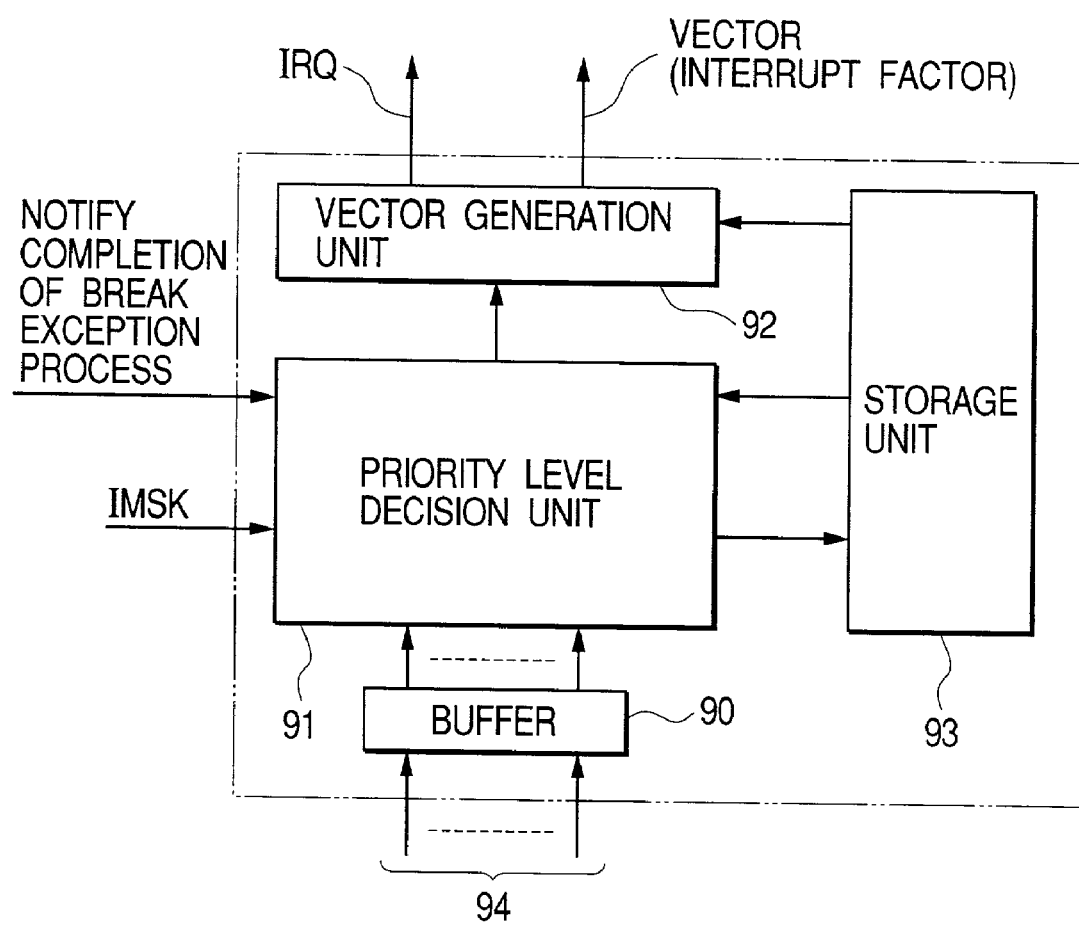
FIG. 14 is a block diagram showing an interrupt request preservable interrupt controller.

FIG. 14 shows the interrupt request-preservable INTC 9. This INTC 9 is composed of a buffer 90, a priority level decision unit 91, a vector generation unit 92 and a storage unit 93. An interrupt request signal 94 is accepted to the buffer 90. The priority level decision unit 92 decides which interrupt request among the competing interrupt requests should be accepted in consideration of the interrupt priority level and the interrupt mask data for the supplied interrupt request. When the accepted interrupt request is present, the vector generation unit 92 asserts the interrupt signal IRQ to output the interrupt factor, together with the interrupt vector. When the request for vector interrupt is detected, the priority level decision unit 91 allows the storage unit to store the interrupt requests after these requests are sorted in accordance with the interrupt priority level, thereby restraining the vector generation unit 92 from outputting the interrupt signal or the like. Upon acknowledgement of completion of the break exception process, the priority level decision unit 91 decides whether or not the interrupt request is stored in the storage unit 93. When it is decided that the interrupt request is stored, the priority level decision unit 91 supplies interrupt request information from the storage unit 93 to the vector generation unit 92 in the order of descending priorities for execution of the interrupt process, before returning to the user program immediately prior to the occurrence of the break interrupt takes place, unless otherwise limited. On completion of execution of all the stored interrupt requests, returning to the user program immediately prior to the occurrence of the break interrupt takes place. Incidentally, the storage unit 93 may be also configured to store only an interrupt request such as high-emergency non-maskable NMI without the need for storage of all the interrupt requests.

A description will now be given of protection against erasing and programming according to the present invention.

Figure 15:
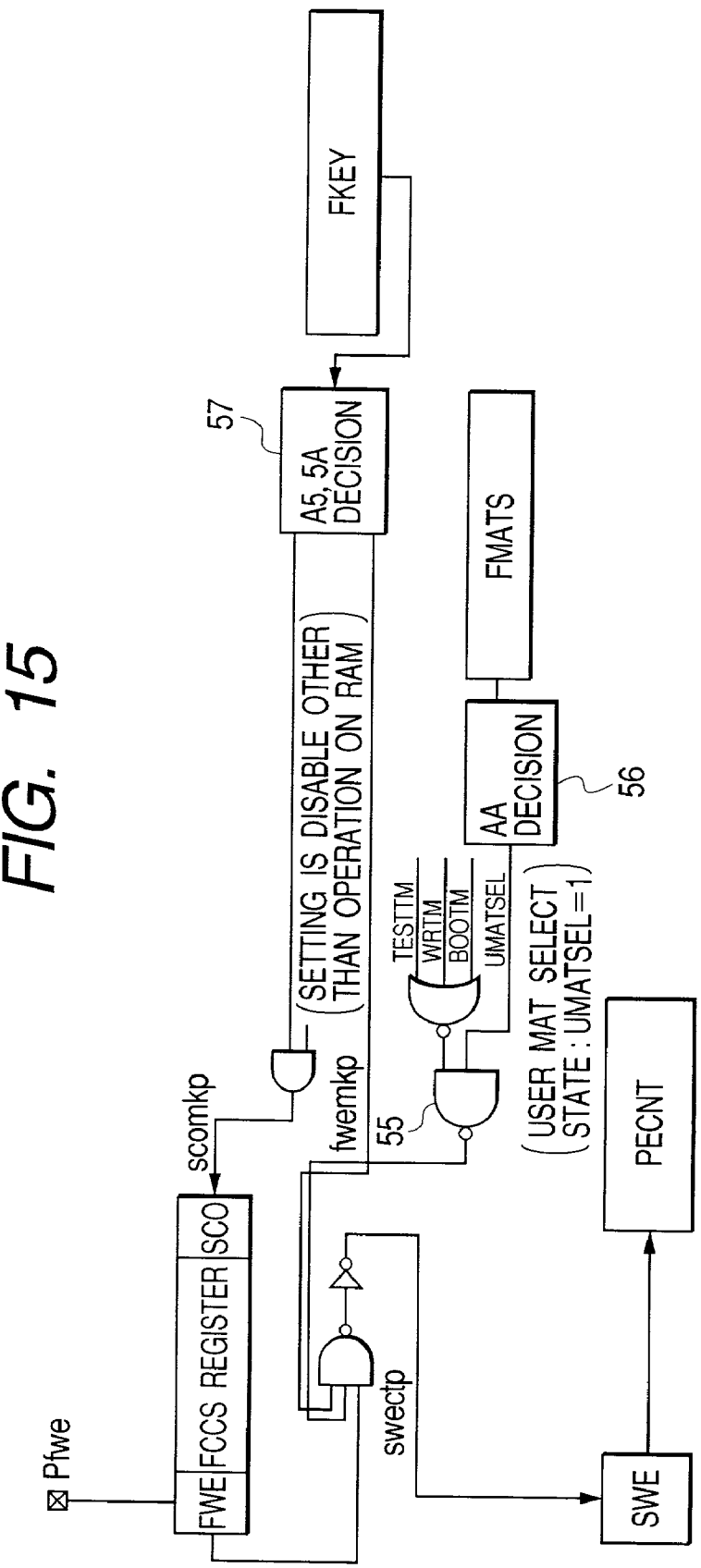
FIG. 15 is a logic circuit diagram showing the logic configuration for protection of a flash memory against erasing and programming.

FIG. 15 shows the logic configuration to protect the flash memory 13 against erasing and programming. The logic shown in FIG. 15 is represented in positive logic, and its configuration is implemented with the flash control module 6.

Erasing and programming operations for the flash memory are enabled by setting control data required for the process to the initial values of the registers PECNT related to erasing and programming. Setting the control bit SWE to a logical value "1" enable to set the control data to the registers PECNT related to erasing and programming. That is, unless the control bit SWE is set to the logical value "1", the flash memory 13 is disabled for erasing and programming.

The first condition to set the control bit SWE to the logical value "1" is that an external terminal pfwe be applied to set an enable bit FWE of the register FCCS to the logical value "1".

The second condition is that the operation mode of setting output of a NAND gate to the logical value "1" be placed in the selected state and the flash memory be placed in the mat select state. That is, the second condition is that the operation mode be the test mode (TESTTM=1), the writer mode (WRTM=1), or the boot mode (BOOT=1), or alternatively that no user boot mat Umat be selected (UMATSEL=1) in the user mode or the user boot mode. Incidentally, the test mode is referred to an operation mode used for a device test in the microcomputer manufacturer. This operation mode enables all the operations, while being closed to the user. That is, the test mode is supposed to be an operation mode provided in consideration of permitting no user setting.

The above signal UMATSEL is considered to be the result of decision of the register FMATS and an AA decision circuit 56 for the set value in the register FTAMS. The register FMATS is used to change the user mat Mmat and the user boot mat Umat. Using the register FMATS permits operation of the CPU 2 to be changed from the user mat Mmat to the user boot mat Umat. However, there are some limitations on change of the mats. That is, the condition to set the user boot mat select bit of the register FMATS is that the CPU 2 be placed in execution of the program in the RAM 3. The above condition is decided with the BSC 4 by detecting that an address area that the CPU 2 is applied to fetch an instruction is equivalent to the address area in the RAM 3. The initial value of the register FMATS represents the user mat select state, and is given by a value other than H'AA. The user boot mat select state is represented by H'AA.

Under the above second condition, access to the user boot mat Umat is enabled in any mode, while programming/erasing is limited to the writer mode and the boot mode (and the test mode).

The third condition is that erase/program allowance values be set to the register FKEY in advance. The register FKEY is provided to prevent the program from being destructed resulting from runaway of the program caused by voltage drop, noise or the like. The register FKEY is used on assumption that runaway of the program occurred after the erase/program control program (the programming/erasing program) has been transferred. While it is basically conditioned that the terminal Pfwe and the control bit SWE are applied to disallow erasing and programming caused by runaway of the CPU, it is better for further increased reliability to set a value "5A" to the register FKEY before the user starts erasing/programming. Unless "5A" is stored, the control bit SWE is disallowed to be set even though FWE is placed enabled ("1"). After the state that "5A" is kept stored in the register FKEY is detected with an A5 5A decision circuit 57, "1" is set to the signal fewmkp (fwemkp=1), enabling the logical value "1" to be set to the SWE.

The register FKEY is functioned as a register related to program transfer, in addition to the register related to programming/erasing program as described the above. That is, in view of availability of the erasing/programming program for the flash memory 13 not only in the boot mode but also in the user boot mode and the user mode in the state of being stored in the boot mat Tmat, the register FCCS needs the control bit SCO to transfer the erasing/programming program from the boot mat Tmat to the RAM 3. Thus, enabling the control bit SCO changes the user mat Mmat and the boot mat Tmat automatically, and the erase/program control program is then transferred from the boot mat Tmat to the RAM 3, and a return instruction is executed for returning to the user process on completion of the above process. At this point, if runaway of the CPU causes transfer of the programming/erasing program in a point at which the user needs no erasing and programming, the user program is highly possible to be destructed. To avoid this, the register FKEY is used. It is necessary for the user to store "A5" in the register FKEY before the control bit SCO is set. Unless "A5" is stored, the control bit SCO fails to be set. Further, it is also conditioned that the CPU 2 be applied to execution of the program in the RAM 3. When "A5" is kept stored and also the CPU 2 is applied to execution operating on the RAM 3, the SCO bit is enabled for setting, permitting transfer of the erasing/programming program from the boot mat Tmat to the RAM 3.

As to erasing and programming for the flash memory 13, since transfer of the program, and erasing and programming are disabled under control of the register FKEY as described the above, programming/erasing is hard to be executed when runaway with no program transferred occurs.

A description will now be given of an erasing/programming process using the program transferred in the SCO mode.

Figure 16:
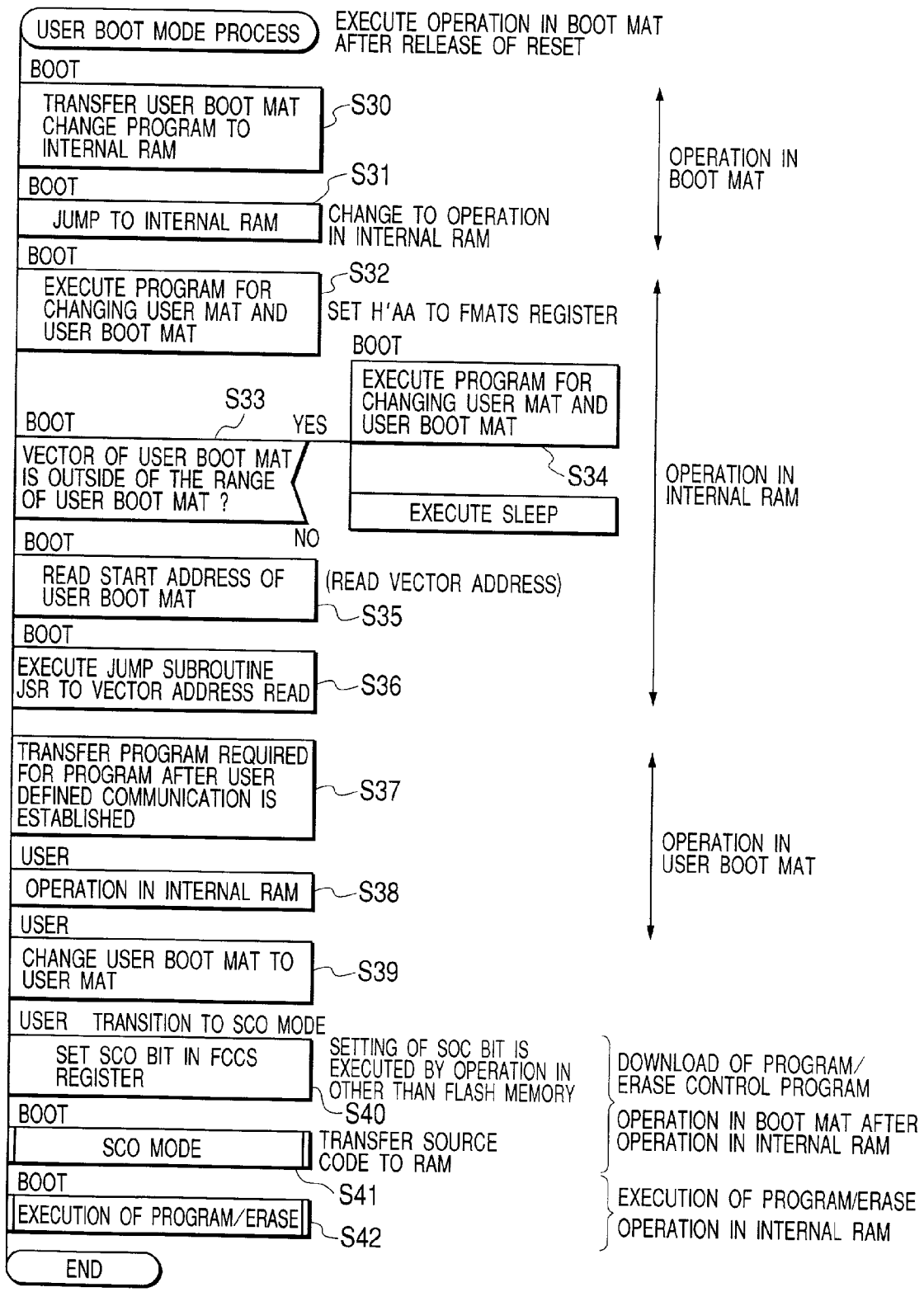
FIG. 16 is a flow chart of a user boot mode process.
Figure 17:
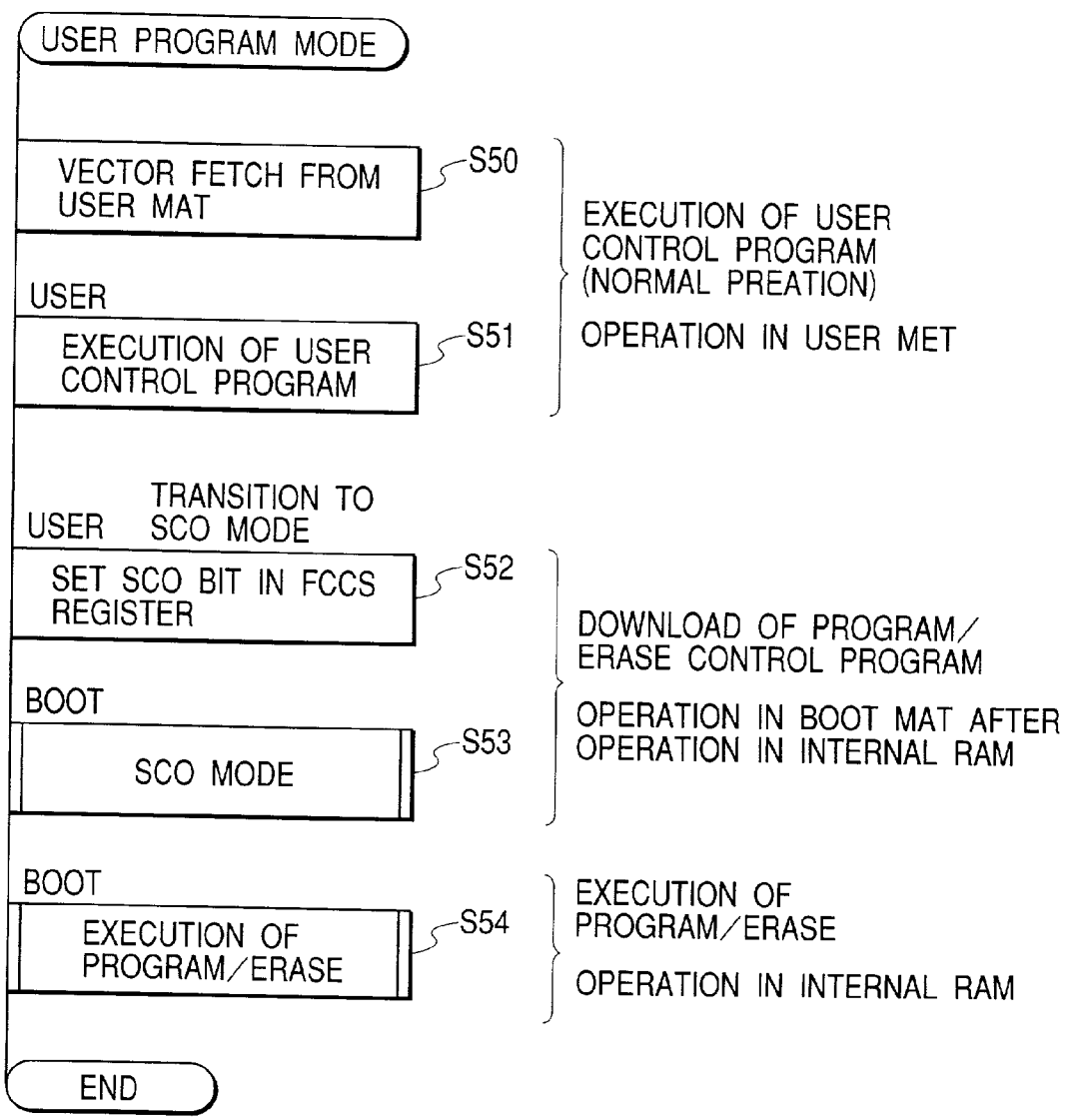
FIG. 17 is a flow chart of a user mode process.

The SCO mode may be specified at the predetermined timing (S41) during the process in the user boot mode shown in FIG. 16, or at the predetermined timing (S53) during the process in the user mode shown in FIG. 17. The SCO mode is also applicable at the optional timing (S23) during the process in the boot mode shown in FIG. 18.

FIG. 16 shows the flow chart of the user boot mode process. Unless otherwise limited, in the boot mode, operation is started with the start vector in the boot mat Tmat to transfer a user boot mat (Umat) change program from the boot mat Tmat to the RAM 3 (S30). Then, transition to operation in the RAM 3 takes place (S31), and H'AA is set to the register FMATS to change the boot mat state (the initial value) specified by the register FMATS to the user boot mat (S32). At this point, it is decided whether or not the area of the user boot mat Umat is outside of the range (S33 and S34). If the area of the user boot mat is set within the range, the start vector address of the user boot mat Umat is read (S35), and jump subroutine to the vector address read takes place (S36). The CPU 2 proceeds to execution of the program in the user boot mat Umat to transfer the user program required for programming to the RAM 3 after user-defined communication is established (S37). The CPU 2 then proceeds to execution of the program in the RAM 3 (S39) and then operates the register FMATS again to change the target mat for processing from the user boot mat Umat to the user mat Mmat (S39). Then, the user program in the RAM is executed to set "1" to the control bit SCO (S40), and transition to the SCO mode process takes place to transfer the erasing/programming program from the boot mat Tmat to the RAM3 (S41). Consequently, execution of program/erase using the transferred erasing/programming program is started (S42).

FIG. 17 shows the flow chart of the user mode process. When the user mode is specified, the vector is fetched at the origin of the user mat Mmat (S50), and execution of the user control program is started (S51). In programming to the user mat Mmat, if needed during the execution of the user program, "1" is set to the SCO bit through operation in the RAM 3 (S52). Then transition to the SCO mode process takes place to transfer the erasing/programming program from the boot mat to the RAM 3 (S53). Consequently, execution of program/erase using the transferred erasing/programming program is started (S54).

Figure 18:
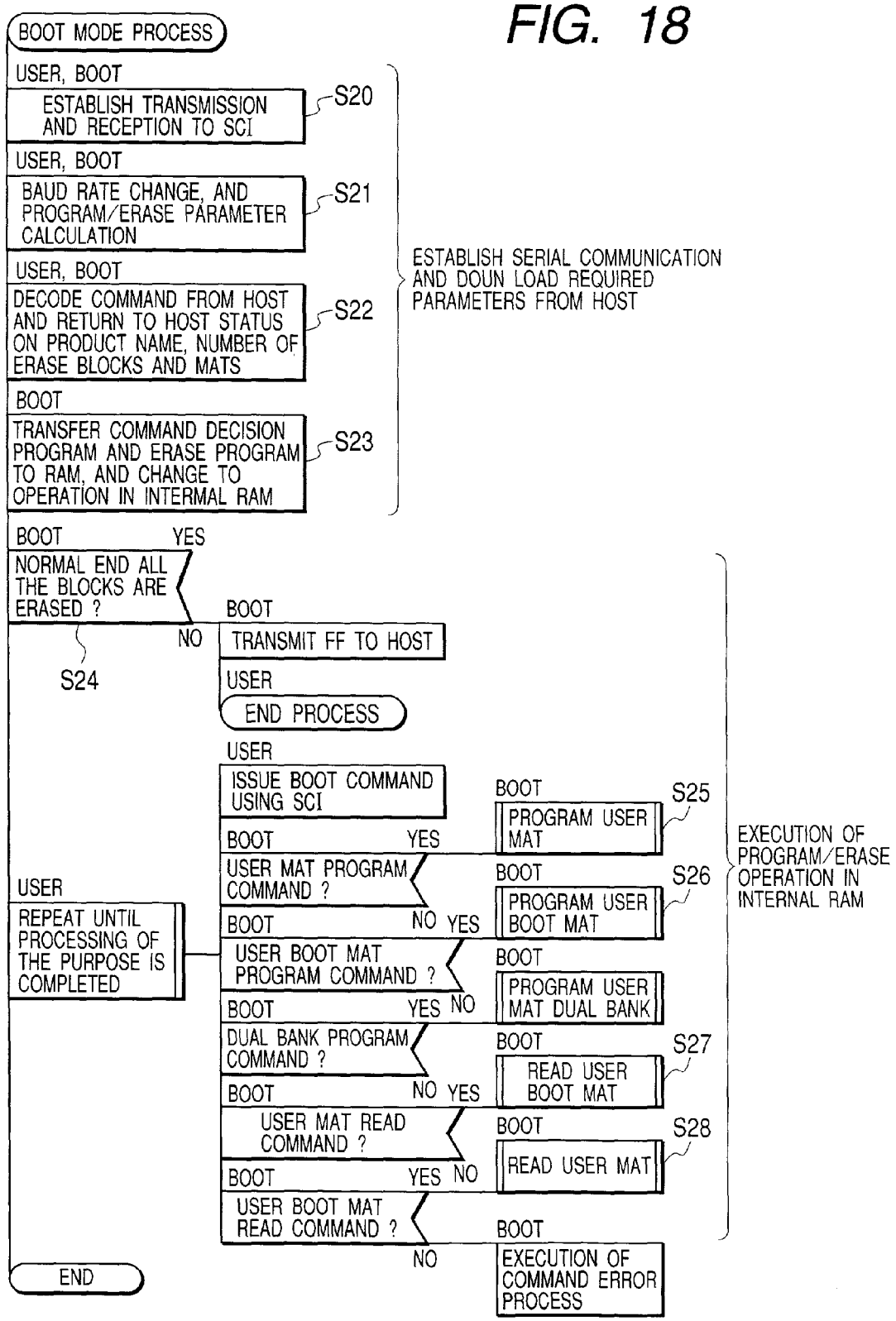
FIG. 18 is a flow chart of a boot mode process.

FIG. 18 shows the flow chart of the boot mode process. After transmission and reception between the onboard serial interface and the SC 12 is established (S20), required parameters such as oscillation frequency of the microcomputer 1 is set by downloading (S21). Subsequently, a command from the host device is decided to return to the host device the status on microcomputer product name and the number of erase blocks (S22). Then, transition to operation in the RAM 3 takes place after the command decision program and the erasing program are transferred to the RAM 3 (the SCO mode is also available in the boot program) (S23). All the blocks of the user mat Mmat and the user boot mat Umat are erased (S24), and consequently, the user mat programming process (S25), the user boot mat programming process (S26) and the program verifying process (S27, S28) or the like are executed while responding to the command.

Figure 19:
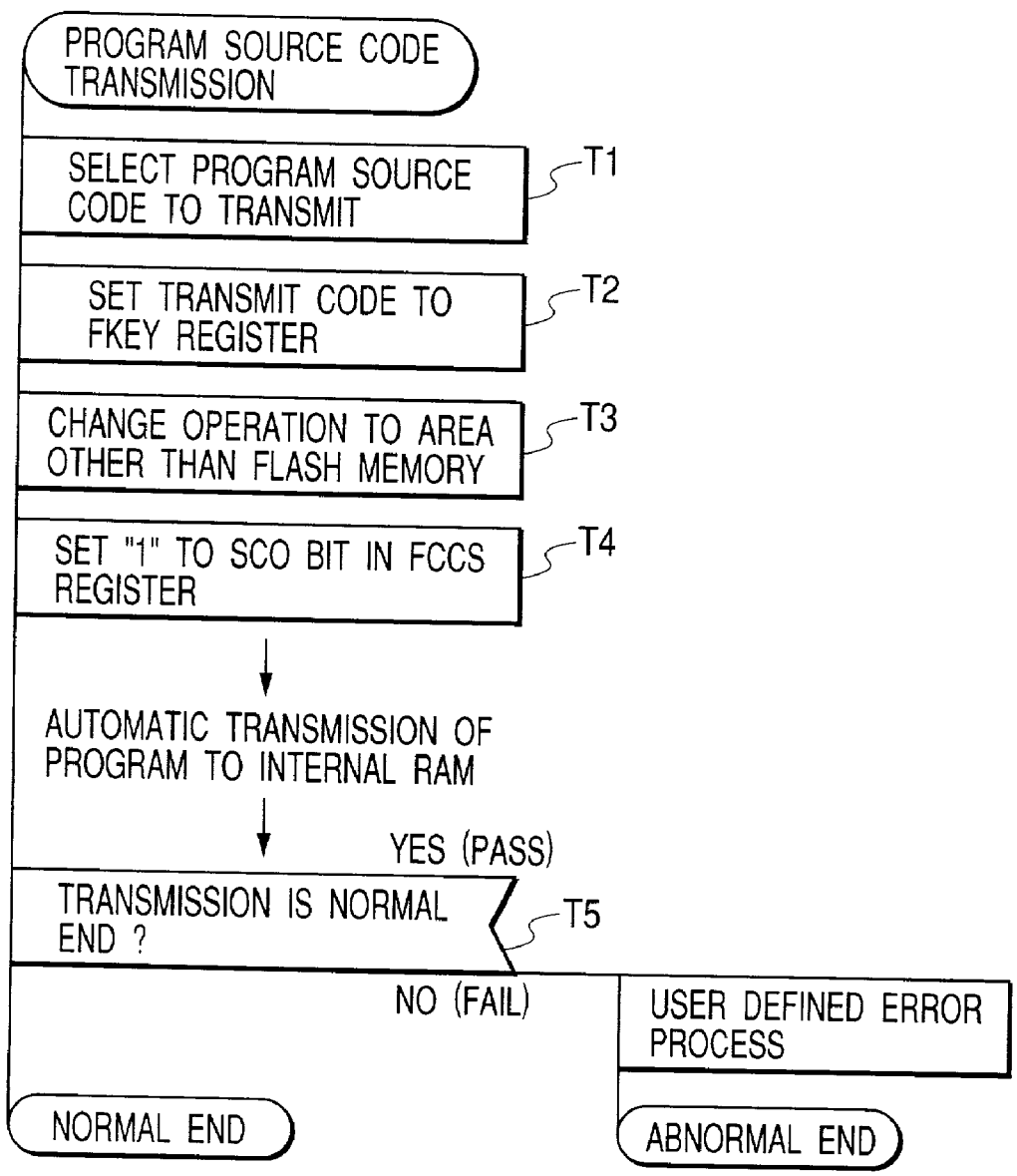
FIG. 19 is a flow chart of a process of transmitting a source program in the SCO mode.

FIG. 19 shows the transmission process of the source program using the SCO mode. Firstly, the source code to transmit is selected (T1). The source code is selected for the register FEPS. Unless otherwise limited, the selectable source code is considered to be the programming and program verifying programs and the erasing and erase verifying programs or the like. Then, before "1" is set to the control bit SCO, "A5" is set to the register FKEY (T2) to change the operation of the CPU 2 to the area other than the flash memory 13, that is, the program area in the RAM 3 (T3). Since access to the boot mat is required in transfer in the SCO mode, the process in T2 is semantically equivalent to the process of software-masking the programming not to destruct information in the boot mat due to runaway of the CPU. The SCO bit is set to change the user mat and the boot mat, and therefore, the process in T3 is executed to meet a demand for changing the CPU to a continuously operational area before the SCO bit is set.

Then, "1" is set to the control bit SCO (T4). Thereby, the selected source code is transmitted to the predetermined area in the RAM as described with reference to FIGS. 7 to 10. After the control bit SCO is enabled, the program is started with the boot mat Tmat automatically. It is decided that transfer is normally ended (T5), before completion of the process.

Figure 20:
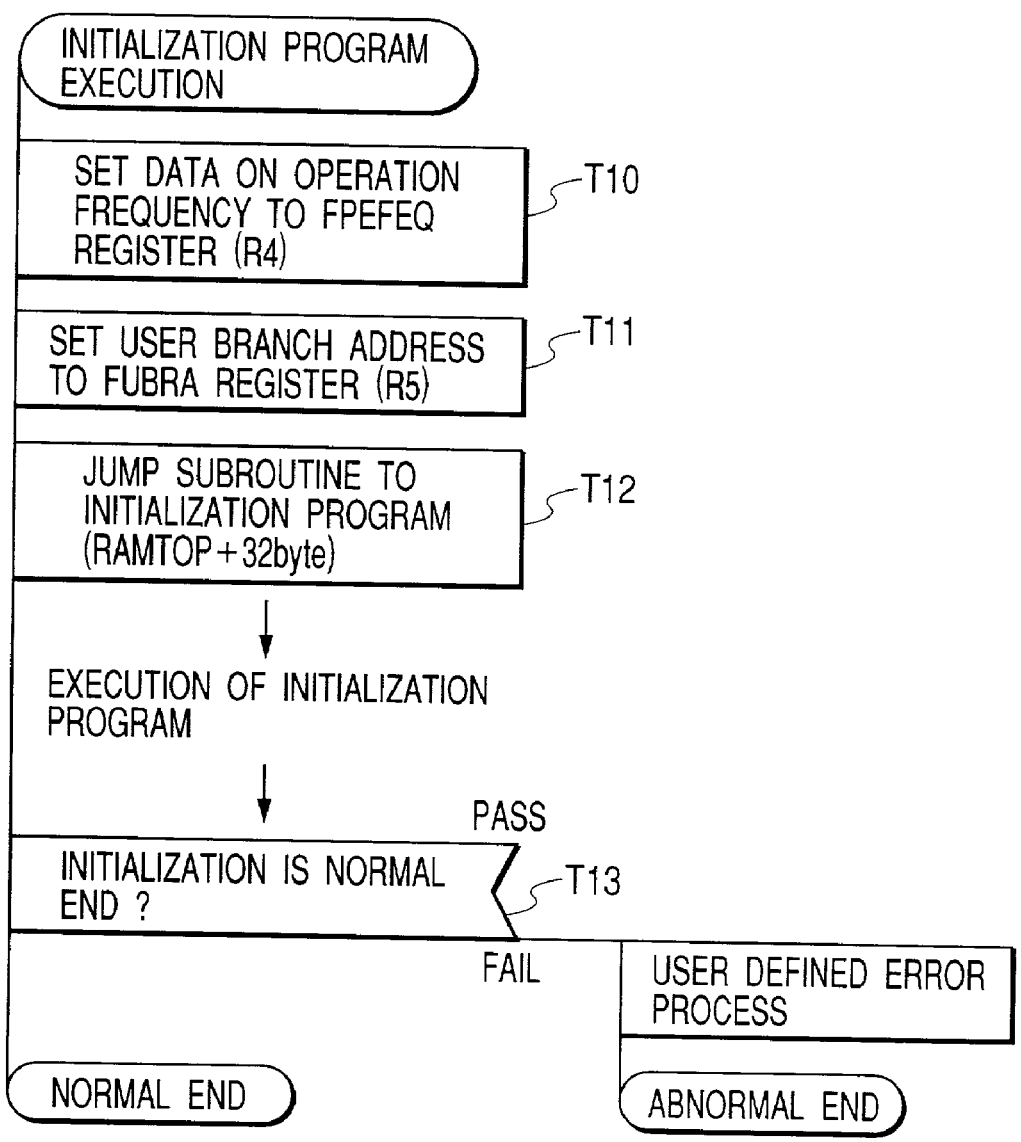
FIG. 20 is a flow chart of an initialization process using a process program transferred to the RAM after release of SCO mode.

FIG. 20 shows initialization executed using the process program transferred to the RAM after release of the SCO mode. The initialization process shown in FIG. 20 is required before the programming/erasing process.

Firstly, data on the operation frequency of the microcomputer 1 is set to the register FPEFEQ (T10), and the user branch address is set to the register FUBRA (T11). The general-purpose register of the CPU 2 may be also assigned to the registers FPEFEQ and FUBRA. Then, subroutine jump takes place to start execution of a program initialization program (T12). For instance, the initialization program related to programming is to determine the number of wait time loop times with reference to the set data on the chip operation frequency. The set wait time data is embedded into the program control program transferred to the RAM 3. The program initialization program is to change the programming program whether the user branch needs to be executed or the user branch, if executed, is jumped to which address with reference to the value in the register FUBRA. That is, the value in the register FUBRA is embedded as a branch destination address in the subroutine jump instruction for execution of user branch. Incidentally, an address of H'00000000, when being set to the register FUBRA, is equivalent to non-execution of user branch. It is decided that the initialization process is normally ended (T13), before completion of the process.

Incidentally, the initialization program as the above subroutine is considered to be a part of the source code transmitted to the RAM 3 in the SCO mode.

As described the above, while the technique of using the erasing/programming program transferred from the first area to the RAM for erasing and programming without the need for an internal sequencer is easy to change the pulse width of applied erase and program voltage, the program/erase pulse width varies depending on the operation frequency of the microcomputer chip. To avoid this, using the register FPEFE for setting information on chip operation frequency permits the user to set information on the chip operation frequency to the operation frequency information setting register FPEFEQ at the time of programming/erasing. Thereby, information on the current operation frequency may be provided for the erasing/programming program with reference to the chip operation frequency register FPEFEQ while the erasing/programming program is in execution. The initialization program may be applied to determine the pulse time required for programming/erasing, the number of wait loop times in the transition time and the timer set conditions on the basis of the chip operation frequency.

Further, program/erase characteristics or the like vary in the wafer as manufacture processes for a semiconductor integrated circuit constituting the microcomputer 2 are varied. The technique of adjusting the program time or the like by trimming is applied to adjustment on the circuit characteristics in accordance with the above variations. This technique may be by a method of adjusting voltage at the programming/erasing time in a self-matching manner after performing programming/erasing at the time of the device test to measure the programming or erasing rate. The above technique may be similarly applied to determine parameters of the erasing/programming program by the initialization program using program/erase characteristic data of the flash memory 13 after performing programming/erasing at the time of a test to store the program/erase characteristics of the flash memory 13 in the boot mat Tmat.

Figure 21:
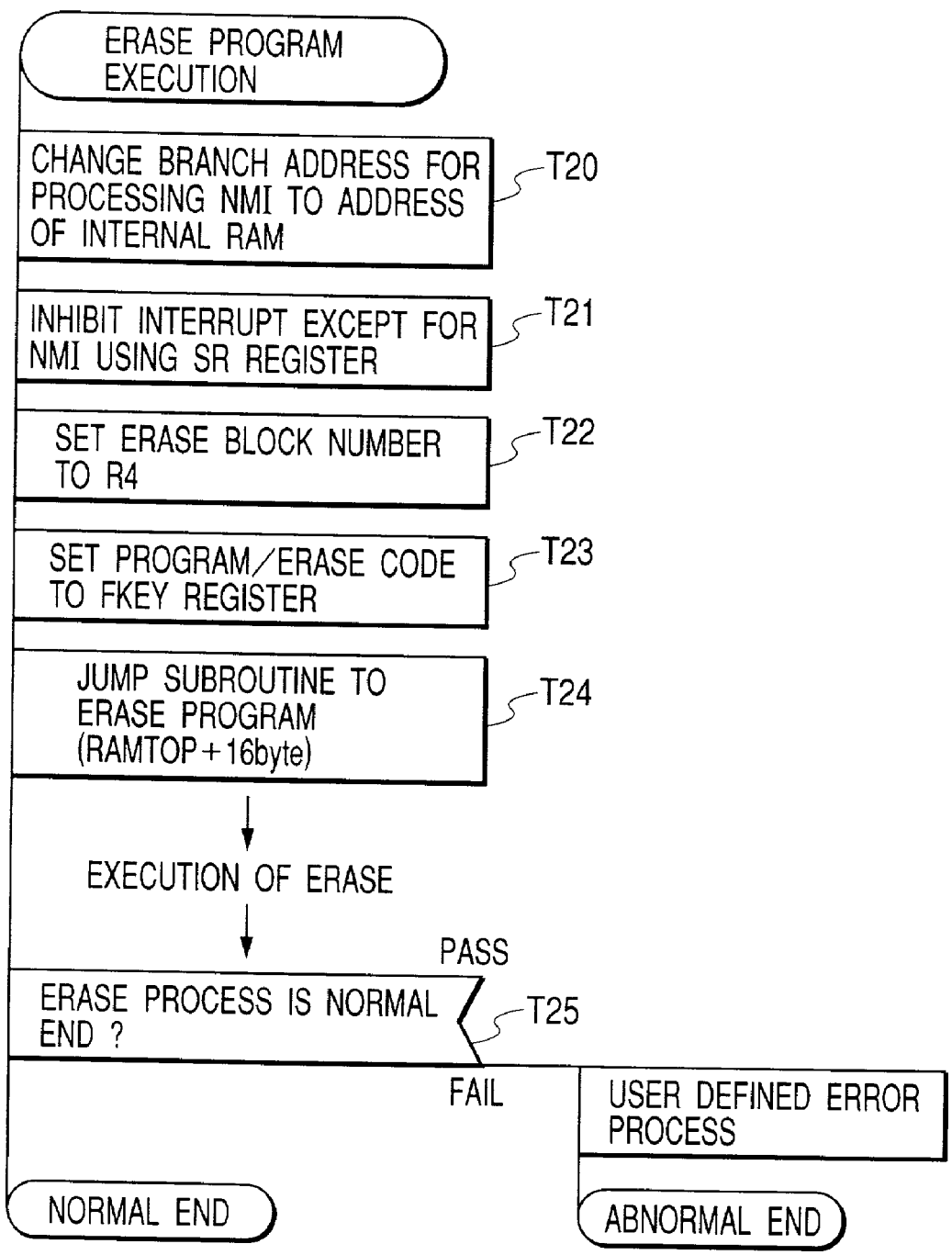
FIG. 21 is a flow chart of an erasing program execution process after initialization.

FIG. 21 shows the erasing program execution process after the initialization process. Firstly, a branch address for processing the non-maskable interrupt (NMI) is changed to an address in the address area of the RAM 3 (T20). For instance, it may be good to change a vector base register to be set to the address area in the RAM 3. This is because it is desirable to avoid the flash memory area in the process of being erased, from the viewpoint of circumvention from malfunctions. It may be good to use such the NMI for calling a user-defined error process routine. Then, interrupts lower in priority level than NMI are masked (T21). For instance, the second priority lower than that of the NMI of the interrupt mask data IMSK will be enough to be set in the status register SR. Since high voltage is applied to the flash memory depending on the state during erasing, interrupt such as IRQ, if occurs in this state, may not ensure the flash memory vector being read. Thus, the interrupts other than NMI are disabled during erasing.

Then, the erase black number is set to the general-purpose register R4 (T22). Thereafter, the program/erase code "5A" is set to the register FKEY (T23), and jump subroutine to the erasing program takes place to start execution of the erasing program (T24). The erasing program as the subroutine is considered to be a part of the source code transferred to the RAM 3 in the SCO mode. It is decided that the erasing is normally ended (T25) prior to completion of the process.

Figure 22:
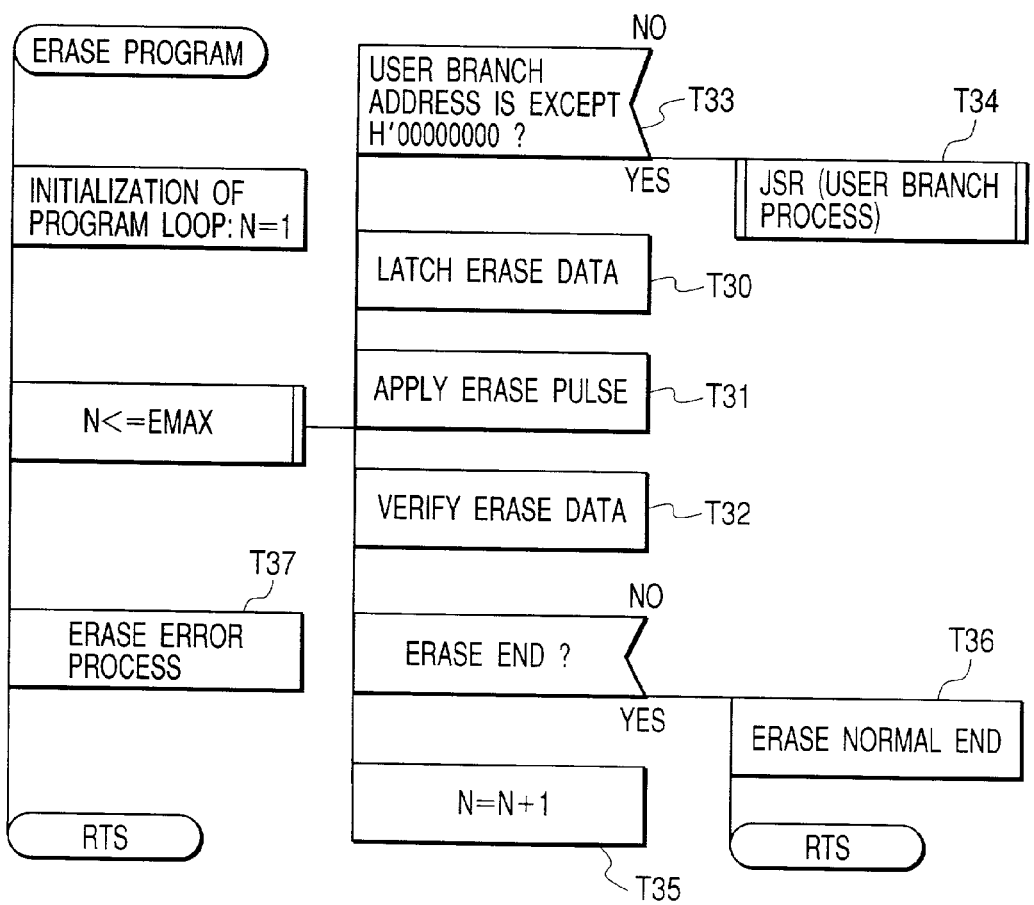
FIG. 22 is a flow chart of an erasing program process jumped from Step T24 in the flow chart of FIG. 21.

FIG. 22 shows the process flow of the erasing program jumped from Step T24 shown in FIG. 21. This process flow includes a step (T33) of deciding that jump subroutine to the user branch address is required in the cycle of an erase data latch process (T30), an erasing pulse application process (T31) and an erase verifying process (T32). When a subroutine jump instruction is issued (when the user branch address is other than H'00000000) according to the value set in the initialization process, branch to the user branch address takes place to start execution of the subroutine (T34). Returning to the erasing routine takes place, after completion of execution of the subroutine. When no predetermined threshold state is found as the result of the erase verifying process, the same loop is repeated after the number of pulse application times N is incremented (T35). Returning to the flow shown in FIG. 21 takes place (T36) whenever the normal erase state is attained before the number of loop repeat times reaches the maximum (EMAX). On the other hand, if the erasing program process fails to be completed normally even after the number of loop repeat times reached the maximum, returning to the flow shown in FIG. 21 takes place after an erasing error process (T37).

Since branching to the process for the subroutine assigned the user branch address is enabled during the cycle of verifying the erase state every application of erasing pulse, control may be returned to the user control program at a certain interval even in the course of erasing. Control that returned to the user control program at a certain interval even in the course of erasing permits erasing without the need to stop the system packaged with the microcomputer 1 for a long period of time.

Figure 23:
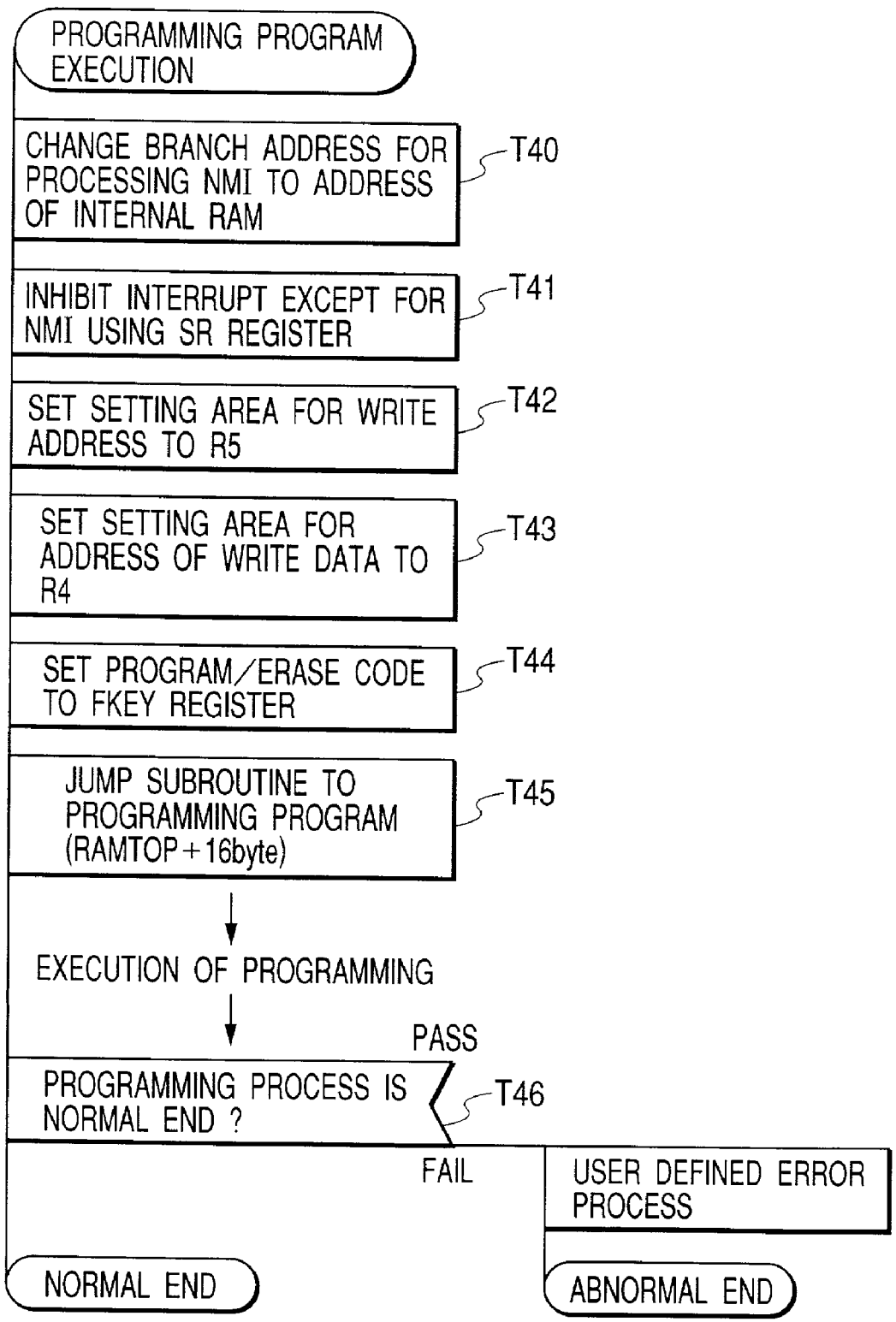
FIG. 23 is a flow chart of a programming program execution process after initialization.

FIG. 23 shows the programming program execution process after the initialization process. Firstly, a branch address for processing the non-maskable interrupt (NMI) is changed to an address in the address area of the RAM 3 (T40). For instance, it may be good to change the vector base register to be set to the address area in the RAM 3. This is because it is desirable to avoid the flash memory area in the course of being programmed, from the viewpoint of circumvention from malfunctions. It may be good to use such the NMI for calling a user-defined error process routine. Interrupts lower in priority level than NMI are masked (T41). For instance, the second interrupt priority lower than that of the NMI of the interrupt mask data IMSK will be enough to be set to the status register SR. Since high voltage is applied to the flash memory depending on the state during programming/erasing, the interrupt such as IRQ, if occurs in this state, may not ensure the flash memory vector being read. Thus, interrupts other than NMI are disabled during programming/erasing.

Then, the set area of the program address is set to the general-purpose register R5 (T42). That is, the start address in the program address area stored in the internal RAM 3 is set to the general-purpose register R4 (T43). Thereafter, the program/erase code "5A" is set to the register FKEY (T44), and jump to the programming program takes place to start execution of the programming program (T45). It is decided that programming is normally ended (T46), before completion of the process. The programming program as the subroutine is considered to be a part of the source code transferred to the RAM in the SCO mode.

Figure 24:
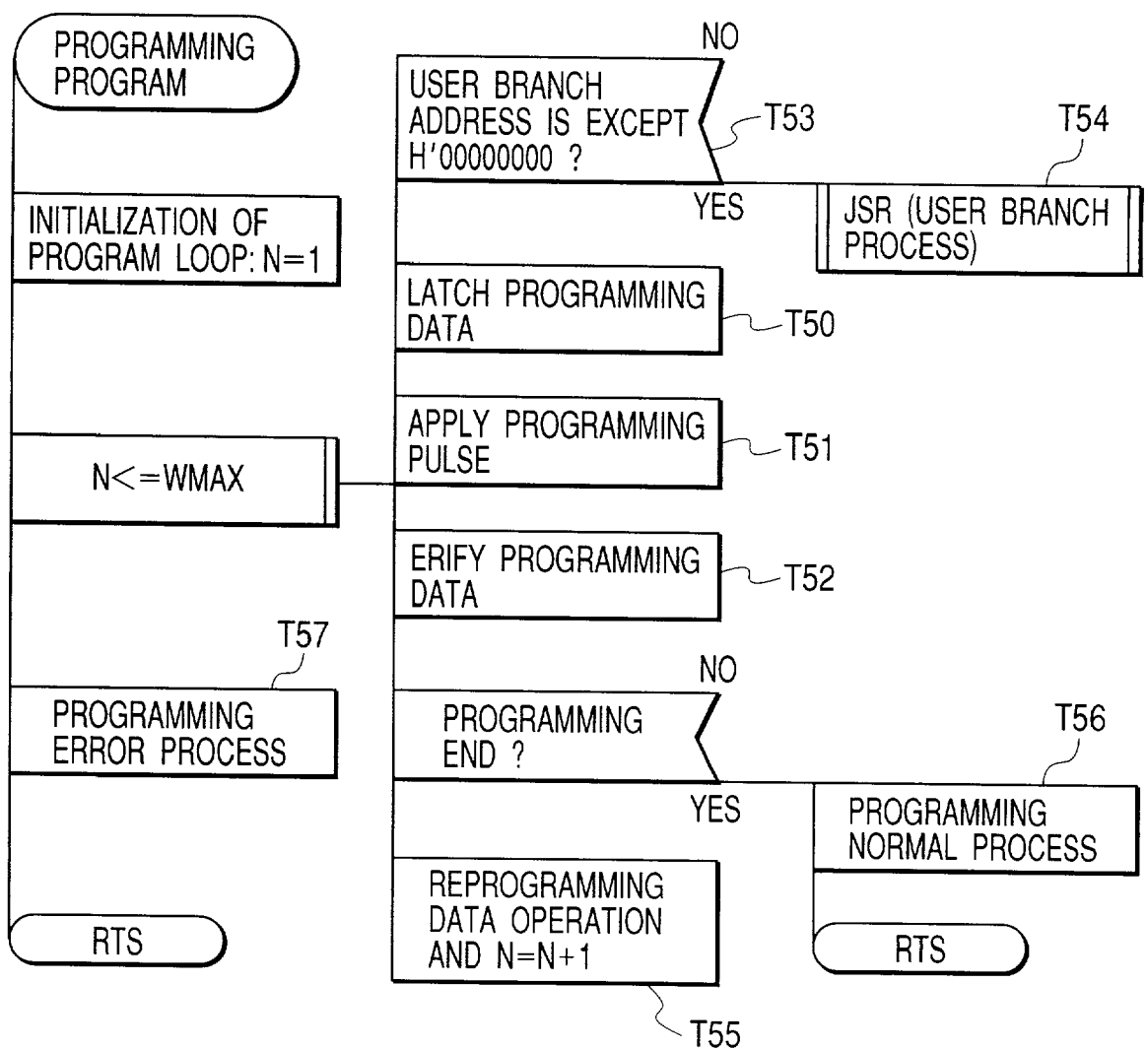
FIG. 24 is a flow chart of a programming program process jumped from Step T45 in the flow chart of FIG. 23.

FIG. 24 shows the process flow of the programming program jumped from Step T45 in FIG. 23. This process flow includes the step (T5) of deciding that subroutine jump to the user branch address is required in the cycle of a program data latch process (T50), a program pulse application process (T51) and a program verifying process (T52). When the subroutine jump instruction is issued (when the user branch address is other than H'00000000) according to the value set in the initialization process, branching to the user branch address takes place to start execution of the subroutine (T54). Returning to the programming routine takes place after execution of the subroutine. When no predetermined threshold state is found as the result of the programming verifying process, the same loop is repeated after the number of pulse application times N is incremented (T55). Returning to the flow shown in FIG. 23 takes place (T56) whenever the program normal state is attained before the number of loop repeat times reaches the maximum (WMAX). On the other hand, when programming fails to be normally completed even after the number of loop repeat times reached the maximum, returning to the flow shown in FIG. 23 takes place after a program error process (T57).

Since branching to the process for subroutine assigned the user branch address is enabled in the cycle of verifying the program state every application of program pulse, control may be returned to the user control program at a certain interval even in the process of programming. Besides, return of control is embodied under software-control, permitting a software-change of an interval required for return to the user control program. Control that is returned to the user control program at a certain interval permits erasing/programming without the need to stop the system packaged with the computer 1 for a long period of time.

The microcomputer 1 having the SCO mode as described the above has the following effects. That is, the process program such as the erasing program, the programming program and the initialization program for the flash memory 13 is stored in the boot mat Tmat in the flash memory 13 operational in the operation mode like the boot mode specified after reset start, and the transfer control program for the process program is also stored therein in advance. With the action of setting "1" to the control bit SCO of the register FCCS as trigger, the state of the on-chip CPU 2 is changed from placed in execution of the user program to enabled for execution of the transfer control program in the boot mat Tmat, and the CPU 2 is returned to the re-execution state of the user program, after the process program is transferred to the on-chip RAM 3. When the CPU 2 proceeds to execution of the transfer control program, the bus state controller 4 is disabled for the external request for the right of bus use priority and disables undesired optional access to the boot mat Tmat. While the CPU 2 is being placed in execution of the transfer control program, the interrupt controller 9 is enabled to preserve the interrupt request in such a manner that the CPU 2 will be serviced after the CPU 2 is returned to the re-execution state the optional program.

As described the above, the action of setting the control bit SCO of the predetermined register FCCS will be enough for transfer of the process program so that the process program such as the erasing/programming program may be transferred automatically to the on-chip RAM 3 as viewed from the user. Thus, the user may apply simple software to enable the on-chip flash memory 13 for erasing and programming. There is no need for any sequence like the boot mode, which requires reset start after alternation on mode terminal setting.

Since the process program is provided in the state of being stored in the boot mat Tmat, the user maybe considerably relieved from the burden of erase/program control even if the complicated erase/program control sequence is required.

On completion of transfer of the process program, returning to the state immediately prior to start of execution of the transfer control program may take place, so that dynamic program transfer is enabled as a part of the execution state of the user program or like optional program, providing enhanced availability of the microcomputer 1 to the user.

Since any external request for the right of bus use priority is disabled while the process program is being transferred, undesired optional access to the boot mat is not authorized, permitting protection of security for other information in the boot mat. Although the request for interrupt or the like occurs during transfer of the process program, the factor of interrupt is kept preserved such that the request for interrupt will be serviced after completion of transfer, resulting in no degradation of system response throughout execution of the user program of like optional program.

Having specifically described the embodiments of the present invention made by the present inventors, it is to be understood that the present invention is not limited to the above embodiments, and its alternations and modifications are possible without departing from the spirit and the scope of the invention.

For instance, the erasable and programmable non-volatile memory is not limited to a binary flash memory. A multiple-value flash memory capable of storing 2-bit or more information in one flash memory cell will be also enough. That is, the multiple-bit flash memory is considered to be a memory configured that multiple bits are assigned to information stored in one memory cell, i.e., a memory, in which one of four or more kinds of threshold voltage states specified by multiple-bit program data is set to one flash memory cell in need for storage of the information, and the threshold voltage state is outputted as corresponding multiple-bit information from the flash memory cell in need for reading of the information. A description will now be given of an embodiment of a flash memory, which permits two-bit information to be stored in or read from one flash memory cell. In the multiple-value information storage technique which will be embodied by the above flash memory, the information storage state of one memory cell is considered to be one selected from an erase state (11), a first program state (10), a second program state (00), and a third program state (10), for instance. Each of four kinds of information storage states in total is supposed to be one determined by two-bit data. That is, the multiple-value flash memory is configured to store two-bit data in one memory cell.

The flash memory cell is not limited to a vertical stack structure composed of the floating gate and the control gate. For instance, a device structure composed of MOS transistor gate electrode provided as floating gate electrode to apply a channel region to a control gate through MOS gate capacity resulting from making the gate electrode longer will be also enough. The non-volatile memory element is not limited to the flash memory, and any other non-volatile memories such as an EEPROM (an electrically erasable and programmable read-only memory) having MNOS (metal nitride oxide semiconductor) transistor as a memory element and a ferroelectric memory will be also good.

The on-chip circuit module of the microcomputer is not limited to the above embodiments, and its modifications will be also possible.

Further, various kinds of register means maybe an internal peripheral register of the flash memory or an internal general-purpose register of the CPU, or otherwise, a memory-mapped I/O register made up of a memory such a SRAM.

A description will now be briefly given of the effects of the above typical features of the present invention disclosed in the present application.

That is, the action of setting specific control information to the predetermined register (SCO bit) will be enough for transfer of the process program so that the process program such as the erasing/programming program may be automatically transferred to the on-chip RAM as viewed from the user. Thus, the user may apply simple software to enable the on-chip flash memory for erasing and programming.

There is no need for any sequence like the boot mode, which requires reset start after alternation on mode terminal setting.

The user may be relieved considerably from the burden of erase/program control, even if the complicated erase/program control sequence is required.

On completion of transfer of the process program, returning to the state immediately prior to start of execution of the transfer control program may take place, so that dynamic program transfer is enabled as a part of the execution state of the user program or like optional program, providing enhanced availability of the microcomputer to the user.

Since any external interrupt for the right bus use priority is disabled while the process program is being transferred, undesired optional access to the boot mat is not authorized, permitting protection of security for other information in the boot mat.

Although the request for interrupt or the like occurs during transfer of the process program, the factor of interrupt is kept preserved such that the interrupt request will be serviced after completion of transfer, resulting in no degradation of system response throughout execution of the user program or like optional program.

What is claimed is:

1. A microcomputer, comprising:
   a CPU (a central processing unit);
   an erasable and programmable nonvolatile memory having a first area and a second area;
   a first designating means capable of designating a first state that said CPU is placed in execution of a program stored in said first area or a second state that said CPU is placed in execution of a program stored in said second area; and
   a second designating means capable of designating a third state that said CPU is placed in execution of a program stored in said first area after transition from said second state,
   wherein said first designating means is made up of an input circuit accepting a mode signal for transition to said first state or said second state in response to release of reset operation, and wherein said second designating means is made up of a first storage means to set first control information for transition to said third state, while being accessible to said CPU in said second state.

2. A microcomputer according to claim 1, further comprising an interrupt control means;
wherein said interrupt control means causes an interrupt request in response to an action of setting the first control information for transition to the third state to said first storage means, and said CPU is changed from the second state to the third state in response to said interrupt request.

3. A microcomputer according to claim 2, further comprising a bus control means;
wherein in response to said first state, said interrupt control means is disabled for any interrupt request, and said bus control means is enabled only for a request for the right of bus use priority from said CPU.

4. A microcomputer according to claim 3, wherein in response to said third state, said bus control means is enabled only for the request for the right of bus use priority from said CPU.

5. A microcomputer according to claim 4, wherein in response to said third state, said interrupt control means starts temporarily preserving the interrupt request in such a maimer that the preserved interrupt request will be serviced after completion of return to said second state.

6. A microcomputer according to claim 1, further comprising a RAM;
wherein a transfer control program executed by said CPU in said third state and a process program transferred to said RAM by the transfer control program are stored in said first area.

7. A microcomputer according to claim 6, wherein said CPU proceeds to execution of the transfer control program in said first area in said third state to transfer said process program to said RAM, and is returned to said second state immediately prior to transition to said third state on completion of transfer of said process program.

8. A microcomputer according to claim 7, further comprising a destination addressing register capable of programmable-addressing the destination in transfer to said RAM.

9. A microcomputer according to claim 7, further comprising a transferred information content register allowed to return the information content of the process program to be transferred to said RAM by the transfer control program.

10. A microcomputer according to claim 7, further comprising a transferred program specifying register capable of selectively specifying the kind of process program to be transferred to said RAM.

11. A microcomputer according to claim 6, wherein said process program includes an erasing/programming program for said nonvolatile memory.

12. A microcomputer according to claim 11, further comprising a second storage means to set second control information considered to be one of the requirements to enable said nonvolatile memory for erasing or programming;
wherein the requirements to enable said first control information to be set to said first storage means are set up by making it a condition that said CPU be applied to set predetermined information other than the second control information to said second storage means in said second state.

13. A microcomputer according to claim 12, wherein the requirements to enable said first control information to be set to said first storage means are set up by making it a condition that said CPU be applied to fetch an instruction from the program stored in said RAM into execution in said second state.

14. A microcomputer according to claim 11, further comprising a frequency register capable of programmable-setting operation frequency information of the microcomputer;
wherein said CPU determines the pulse width of applied high voltage by said erasing/programming program with reference to said frequency register in said second state.

15. A microcomputer according to claim 11, wherein characteristic information of said nonvolatile memory is stored in said first area, and said CPU determines predetermined parameters in said erasing/programming program with reference to the characteristic information in said second state.

16. A data processing device, comprising:
a CPU (a central processing unit);
a volatile memory;
an electrically programmable nonvolatile memory having a first storage area for storing a programming program and a transfer control program to transfer said programming program to said volatile memory and a second storage area for storing a control program processed by said CPU in a first operation mode, while said CPU is enabled to program information by executing said programming program from said volatile memory; and
a storage circuit to set control information by said CPU placed in execution of said control program in said first operation mode,
wherein in response to an action of setting said control information to said storage circuit, said CPU shifts to a second operation mode, and proceeds to execution of said transfer control program to transfer said programming program to said volatile memory, and
wherein on completion of transfer of said programming program to said volatile memory, said CPU is returned to said first operation mode for re-execution said control program.

17. A data processing device according to claim 16,
wherein in said first operation mode that said CPU is placed in execution of said control program, said CPU starts programming information to said nonvolatile memory by changing its operation from execution of said control program to execution of said programming program transferred to said volatile memory, and
wherein on completion of programming of information to said nonvolatile memory, said CPU returns its operation from execution of said programming program to execution of said control program.

18. A data processing device according to claim 16, further comprising:
a bus connected to said CPU, said volatile memory arid said nonvolatile memory; a bus master connected to said bus and different in configuration from said CPU; and
a bus control circuit connected to said bus to control the right of bus use priority;
wherein said bus control circuit is disabled for requests for said right of bus use priority from said bus master while said CPU is being placed in execution of said transfer control program.

19. A data processing device according to claim 18, further comprising an interrupt control circuit connected to said bus and said CPU to notify said CPU of the occurrence of a request for interrupt;

wherein said interrupt control circuit has a storage circuit for storing the interrupt request being enabled while said CPU is being placed in execution of said transfer control program, and wherein the interrupt request stored in said storage circuit is serviced by said CPU on completion of execution of said transfer control program by said CPU.

20. A data processing device according to claim 18, further comprising an interrupt control circuit connected to said bus and said CPU to notify said CPU of the occurrence of an interrupt request and/or an exception process request, wherein said interrupt control circuit issues the exception process request higher in priority than a non-maskable request to said CPU in response to the action of setting said control information to said storage circuit, wherein said CPU changes its operation from execution of said control program in said first operation mode to execution of said transfer control program in said second operation mode on acknowledgement of said exception process request, wherein said interrupt control circuit has a storage circuit for storing the interrupt request being enabled while said CPU is being placed in execution of said transfer control program, and wherein the interrupt request stored in said storage circuit is serviced by said CPU on completion of execution of said transfer control program by said CPU.

21. A data processing device according to claim 16, wherein said nonvolatile memory has a plurality of electrically erasable and programmable memory cells each having a floating gate.

22. A data processing device according to claim 21, wherein said nonvolatile memory includes a flash memory.

23. A data processing device according to claim 16, wherein said data processing device is formed on one semiconductor substrate.

24. A data processing device, comprising:
a CPU (a central processing unit):
a volatile memory;
an electrically erasable nonvolatile memory having a first storage area for storing an erasing program and a transfer control program to transfer said erasing program to said volatile memory and a second storage area for storing a control program processed by said CPU in a first operation mode, while said CPU is enabled to erase information by executing said erasing program from said volatile memory; and
a storage circuit to set control information by said CPU placed in execution of said control program in said first operation mode,
wherein said CPU shifts to a second operation mode, and proceeds to execution of said transfer control program in response to the action of setting said control information to said storage circuit to transfer said erasing program to said volatile memory, and
wherein said CPU is returned to said first operation mode for re-execution of said control program on completion of transfer of said erasing program to said volatile memory.

25. A data processing device according to claim 24, wherein in said first operation mode that said CPU is placed in execution of said control program, said CPU starts erasing information from said nonvolatile memory by changing its operation from execution of said control program to execution of said erasing program transferred to said volatile memory, and wherein on completion of erasing of information from said nonvolatile memory, said CPU returns its operation from execution of said erasing program to execution of said control program.

26. A data processing device according to claim 24, further comprising;
a bus connected to said CPU, said volatile memory and said non-volatile memory;
a bus master connected to said bus and different in configuration from said CPU; and
a bus control circuit connected to said bus to control the right of bus use priority;
wherein said bus control circuit is disabled for requests for said right of bus use priority from said bus master while said CPU is being placed in execution of said transfer control program.

27. A data processing device according to claim 26, further comprising an interrupt control circuit connected to said CPU to notify said CPU of the occurrence of a request for interrupt;
wherein said interrupt control circuit has a storage circuit for storing the interrupt request being enabled while said CPU is placed in execution of said transfer control program, and
wherein the interrupt request stored in said storage circuit is serviced by said CPU on completion of execution of said transfer control program by said CPU.

28. A data processing device according to claim 24, further comprising an interrupt control circuit connected to said CPU to notify said CPU of the occurrence of an interrupt request and/or an exception process request;
wherein said interrupt control circuit issues the exception process request higher in priority level than a non-maskable interrupt request to said CPU in response to the action of setting said control information to said storage circuit,
wherein said CPU changes its operation from execution of said control program in said first operation mode to execution of said transfer control program in said second operation mode on acknowledgement of said exception process request,
wherein said interrupt control circuit has a storage circuit for storing the interrupt request being enabled while said CPU is being placed in execution of said transfer control program, and
wherein the interrupt request stored in said storage circuit is serviced by said CPU on completion of execution of said transfer control program by said CPU.

29. A data processing device according to claim 24, wherein said nonvolatile memory has a plurality of electrically erasable and programmable memory cells each having a floating gate.

30. A data processing device according to claim 29, wherein said nonvolatile memory includes a flash memory.

31. A data processing device according to claim 24, wherein said data processing device is formed on one semiconductor substrate.

32. A data processing device, comprising:
a CPU (a central processing unit);
a volatile memory;
an electrically erasable nonvolatile memory having a first storage area for storing programming and erasing programs and a transfer control program to transfer said programming and erasing programs to said volatile memory and a second storage area for storing a control program processed by said CPU in a first operation mode, while said CPU is enabled to program and erase information by executing said programming and erasing programs from said volatile memory; and a storage circuit to set control information by said CPU placed in execution of said control program in said first operation mode;

wherein in response to the action of setting said control information to said storage circuit, said CPU shifts to a second operation mode, and proceeds to execution of said transfer control program to transfer said programming and erasing programs to said volatile memory, and wherein on completion of transfer of said programming and erasing programs to said volatile memory, said CPU is returned to said first operation mode for re-execution of said control program.

33. A data processing device according to claim 32, wherein in said first operation mode that said CPU is placed in execution of said control program, said CPU starts programming information to or erasing information from said nonvolatile memory by changing its operation from execution of said control program to execution of said programming or erasing program transferred to said volatile memory, and wherein on completion of programming of information to or erasing of information from said nonvolatile memory, said CPU returns its operation from execution of said programming or erasing program to execution of said control program.

34. A data processing device according to claim 32, further comprising:

a bus connected to said CPU, said volatile memory and said nonvolatile memory;

a bus master connected to said bus and different in configuration from said CPU; and a bus control circuit connected to said bus to control the right of bus use priority;

wherein said bus control circuit is disabled for any request for said right of bus use priority from said bus master while said CPU is being placed in execution of said transfer control program.

35. A data processing device according to claim 34, further comprising an interrupt control circuit connected to said bus and said CPU to notify said CPU of the occurrence of an interrupt request;

wherein said interrupt control circuit has a storage circuit for storing the interrupt request being enabled while said CPU is being placed in execution of said transfer control program, and wherein the interrupt request stored in said storage circuit is serviced by said CPU on completion of execution of said transfer control program by said CPU.

36. A data processing device according to claim 32, further comprising an interrupt control circuit connected to said CPU to notify said CPU of the occurrence of an interrupt request and/or an exception process request, wherein said interrupt control circuit issues the exception process request higher in priority level than a non-maskable interrupt request to said CPU in response to the action of setting said control information to said storage circuit, wherein said CPU changes its operation from execution of said control program in said first operation mode to execution of said transfer control program in said second operation mode on acknowledgement of said exception process request, wherein said interrupt control circuit has a storage circuit for storing the interrupt request being enabled while said CPU is being placed in execution of said transfer control program, and wherein the interrupt request stored in said storage circuit is serviced by said CPU on completion of execution of said transfer control program by said CPU.

37. A data processing device according to claim 32, wherein said nonvolatile memory has a plurality of electrically programmable erasable memory cells each having a floating gate.

38. A data processing device according to claim 37, wherein said nonvolatile memory includes a flash memory.

39. A data processing device according to claim 32, wherein said data processing device is formed on one semiconductor substrate.

* * * * *